(12) United States Patent
Kai et al.

(10) Patent No.: US 8,051,204 B2
(45) Date of Patent: Nov. 1, 2011

(54) INFORMATION ASSET MANAGEMENT SYSTEM, LOG ANALYSIS SERVER, LOG ANALYSIS PROGRAM, AND PORTABLE MEDIUM

(75) Inventors: Satoshi Kai, Yokohama (JP); Masato Arai, Yokohama (JP); Yoshinobu Tanigawa, Yokohama (JP); Hiromi Igawa, Kawasaki (JP); Akira Morita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 552 days.

(21) Appl. No.: 12/061,237

(22) Filed: Apr. 2, 2008

(65) Prior Publication Data

US 2008/0281962 A1    Nov. 13, 2008

(30) Foreign Application Priority Data

Apr. 5, 2007   (JP) ................................ 2007-099450
Jun. 13, 2007  (JP) ................................ 2007-156371

(51) Int. Cl.
*G06F 15/173*   (2006.01)

(52) U.S. Cl. .................................................... 709/242
(58) Field of Classification Search .................. 709/233, 709/239; 370/252, 389, 238
See application file for complete search history.

(56) References Cited

U.S. PATENT DOCUMENTS

| 7,095,854 | B1* | 8/2006 | Ginter et al. ................... 380/233 |
| 2005/0262575 | A1* | 11/2005 | Dweck et al. .................... 726/28 |
| 2006/0041840 | A1* | 2/2006 | Blair et al. ..................... 715/513 |
| 2007/0025701 | A1* | 2/2007 | Kawasaki et al. ................ 386/95 |
| 2007/0162927 | A1* | 7/2007 | Ramaswamy et al. .......... 725/36 |

FOREIGN PATENT DOCUMENTS

| JP | 2005-109779 | 4/2005 |
| JP | 2006-518893 | 8/2006 |
| WO | WO 2004/066082 | 8/2004 |

* cited by examiner

*Primary Examiner* — Joseph Avellino
*Assistant Examiner* — Mark O Afolabi
(74) *Attorney, Agent, or Firm* — Antonelli, Terry, Stout & Kraus, LLP.

(57) ABSTRACT

An information asset management system in a network environment includes a monitoring program 11 that monitors operation events performed by users and creates terminal logs 12, a terminal log collection program 21 that stores an integrated log 22 created by collecting the terminal logs 12, and a correlation analysis program 31 that analyzes the whereabouts of information assets using the integrated log 22. When the user exports an information asset from the network environment and when the user imports the information asset into the network environment, the monitoring program 11 monitors these export and import events including feature values of the information assets. The correlation analysis program 31 compares a pre-export feature value of each information asset with a post-import feature value of each information asset to determine whether the information assets are identical and reports a list of information assets in the organization.

9 Claims, 18 Drawing Sheets

F I G . 1
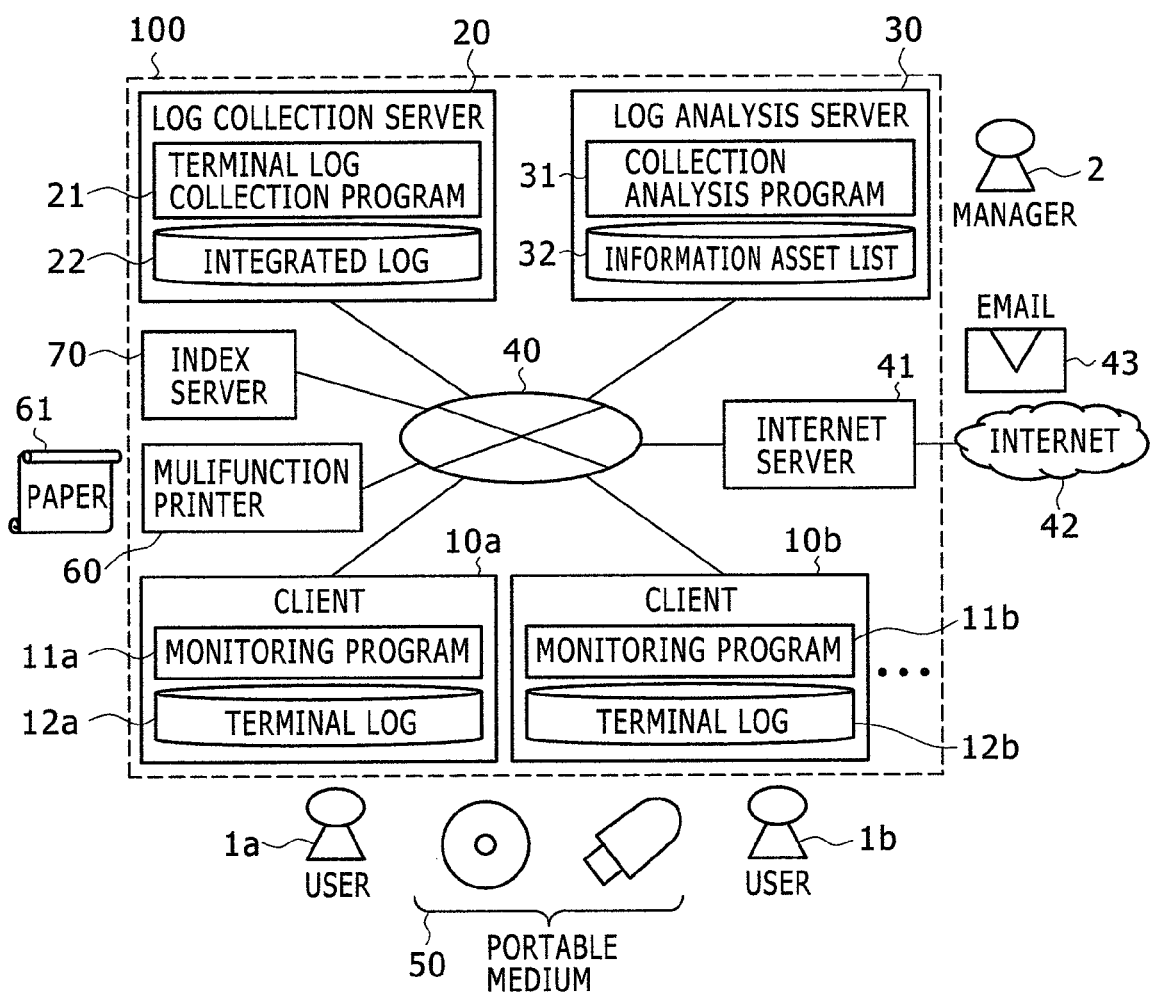

INFORMATION ASSET MANAGEMENT SYSTEM, LOG ANALYSIS SERVER, LOG ANALYSIS PROGRAM, AND PORTABLE MEDIUM

INCORPORATION BY REFERENCE

This application claims priority based on Japanese patent applications, No. 2007-099450 filed on Apr. 5, 2007 and No. 2007-156371 filed on Jun. 13, 2007, the entire contents of which are incorporated herein by reference.

BACKGROUND OF THE INVENTION

The present invention relates to an information asset management reporting technology for visualizing and reporting the whereabouts of information assets under management of an organization.

Information such as personal information or trade secrets in an organization has recently been increasingly computerized. The computerized information is provided as files on a computer or as data in a memory. Leakage of files containing such information frequently occurs, causing significant damage. In the following description, a file containing confidential information such as personal information or trade secrets will be referred to as an "information asset". Since such information assets are files, they are easily duplicated, transferred, and processed and it is difficult to manage and determine their whereabouts (or locations). It is nearly impossible to determine usage of information assets such as how and by whom they are used. For example, it is very difficult to cope with accidental leaks such as leakage of information assets that were duplicated without the user's knowledge or leakage of information assets due to forgetting to delete them although they should be deleted according to the rules of the organization.

Outsourcing companies mostly conduct work using information assets received from customers. Outsourcing companies should delete information assets received from customers after the term of the outsourcing contract expires. Thus, it can be easily expected that outsourcing companies need to prove to customers that they have properly handled the information assets and also to delete the information assets without leakage after the term of the contract expires.

To deal with the risk of authorized users easily taking (or exporting) information assets or copies of information assets outside a network environment under management or a file management system (hereinafter referred to as a "network environment"), Japanese Unexamined Patent Application Publication No. 2006-518893 (Document 1) suggested a system that monitors and reports usage of information assets in the network environment to a manager, thereby easily detecting unexpected behavior patterns. With knowledge of where information assets under management of an organization are present, this system can detect, for example, whether or not any file has been sent as an email attachment, whether or not any file has been uploaded to a common storage region on the Internet, and whether or not any file has been written to a Universal Serial Bus (USB) flash memory or CD-Recordable (CD-R)/Digital Versatile Disk Recordable (DVD-R).

Google has introduced "Enterprise Solution" (URL:http://www.google.co.jp/enterprise/) (Document 2). To determine where information assets are present in a network environment, this system crawls files and indexes the contents of the files to find information assets at high speed. This system permits a user who desires to find an information asset to quickly locate the information asset simply by specifying a keyword.

According to a system disclosed in Japanese Patent Application Publication (JP-A) No. 2005-109779 (Document 3), to prevent an encrypted file from being decrypted at an arbitrary Personal Computer (PC), a dependent file for generating a decryption key is stored in specific PCs so that the decoding key can be generated only at the specific PCs which contain the dependent file. Even if information assets are exported to an arbitrary PC, this system prevents leakage of the information assets by preventing decryption of the information assets at the PC.

SUMMARY OF THE INVENTION

To determine the whereabouts of information assets that are easily duplicated, transferred, and processed, it is necessary to keep tack of the information assets. For example, when information assets are exported to a USB flash memory, CD-R/DVD-R, paper, an email, or the like not under management of the network environment of an organization and are then returned to be under management of the network environment, it is necessary to keep tack of the information assets. According to the conventional technology described in Document 1, when a pair of events of an information asset (or file) has occurred, for example when the information asset is imported to again be under management of the network environment after being exported out of management, it is not possible to determine whether the imported information asset is a new file or the same as has been under management of the network environment.

It is also necessary to keep tack of information assets when the information assets are kept under management of the network environment of an organization. For example, when an event of file format conversion such as compression or encryption of a file has occurred, it is also necessary to determine whether or not the converted file is an information asset. According to the conventional technology described in Document 2, when the format of a file has been converted, it is difficult to index the contents of the converted file and is not possible to determine if the converted file is an information asset.

In addition, it is necessary to keep tack of an information asset stored in a portable medium such as a USB flash memory or a compact flash memory card and also to keep track of the information asset when the portable medium containing the information asset is coupled, for example, to a PC at home not under management of the network environment and the information asset is then copied from the portable medium to the PC. Further, it is necessary to prevent unauthorized use of an information asset such as copying of the information asset to a PC at home via a portable medium and also to prevent leakage of information assets from a lost or stolen portable medium.

The invention provides an information asset management system, an information asset analysis server, an information asset analysis program and portable medium which can manage and report information assets that are under management of a network environment even when various events have occurred in association with the information assets.

One embodiment of the invention provides an information asset management system in a network environment coupled to both a terminal that is operated by a user and a log analyzer including a log analysis program, wherein the terminal includes a monitoring unit that monitors operations performed by the user and outputs a terminal log including respective feature values of an information asset before and after a pair of events of the information asset occurs, and the log analyzer includes a correlation analyzer that determines whereabouts of the information asset by analyzing an integrated log, which is created by integrating terminal logs collected over a network, based on feature values in the integrated log and reports analysis results obtained through the correlation analyzer.

In this embodiment, in the network environment under management of an organization, files (or operation events performed by the user for files) are monitored together with their feature values when a pair of export and import events of each file (for example, a pair of an event of exporting the file from the network environment to a USB flash memory, a CD-R/DVD-R, paper, an email, or the like and an event of importing the file back into the network environment) occurs. Here, the log analyzer compares a post-import feature value of each information asset (i.e., each file) with a pre-export feature value of each information asset to determine whether or not the information assets are identical and reports a list of information assets in the organization.

In addition, in the network environment under management of an organization, files are monitored together with their feature values generated when file format conversion such as compression or encryption is performed and files are monitored together with their new feature values generated when inverse file format conversion such as decompression or decryption is performed. Here, the log analyzer compares a post-inverse-conversion feature value of each information asset with a pre-conversion feature value of each information asset to determine whether or not the information assets are identical and reports a list of information assets in the organization.

In another embodiment of the invention, when writing is performed to a portable medium such as a USB flash memory or a compact flash memory card, only a file in a conditional self-decodable format (conditional self-decryption file) having conditions for decryption is permitted to be written to the portable medium. The conditions for decryption include a condition for determining whether or not a portable medium coupled to a PC to decrypt a file is a specified one and a condition for determining whether or not a PC coupled to the portable medium is a specified one. Accordingly, when a file is decrypted, a log indicating success or failure of the decryption and the PC to which the portable medium is coupled (also referred to as a "coupling destination PC") is left in the portable medium, and leakage of information assets to unspecified PCs is prevented.

The information asset management system according to the invention has a variety of advantages. One advantage is that it is possible to keep tack of files that are specified as information assets in an organization. For example, it is possible to correctly and easily identify information assets which are present in a location with a high risk of leakage such as a portable medium. It is also possible to correctly and easily determine where information assets, which should be deleted since the term of the contract expires, are in an outsourcing company even when they have been encrypted.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 1 illustrates the overall configuration of an information asset management reporting system according to a first embodiment of the invention.

DETAILED DESCRIPTION OF THE EMBODIMENTS

Figure 2:
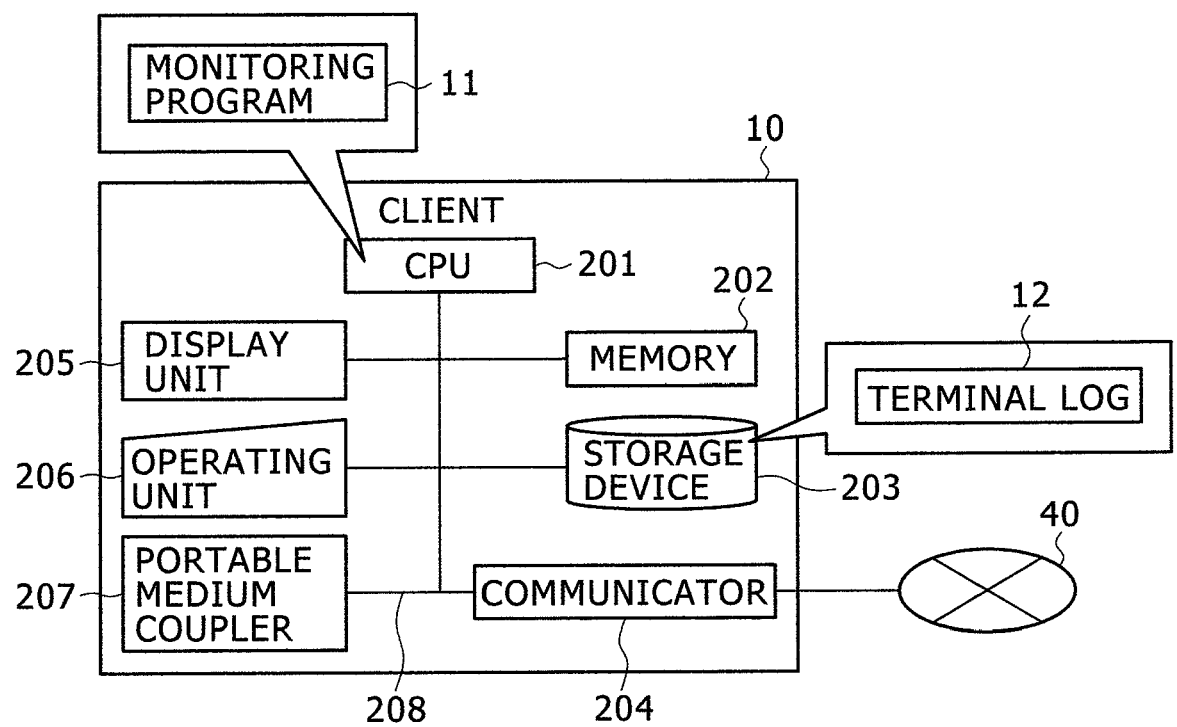
FIG. 2 is a block diagram illustrating a client in the first embodiment.

Preferred embodiments of an information asset management system according to the invention will now be described with reference to the accompanying drawings.

FIG. 1 illustrates the overall configuration of an information asset management reporting system 100 that is the first embodiment of the invention. The information asset management reporting system 100, which provides a network environment, includes one or more clients 10a and 10b, a log collection server 20, and a log analysis server 30 which are coupled wired or wirelessly to a network 40. The clients 10a and 10b are terminals such as PCs. The log collection server 20 functions as a log collector and the log analysis server 30 functions as a log analyzer. In the information asset management reporting system 100, an Internet server 41, a multifunction printer 60, and an index server 70 are also coupled to the network 40.

The Internet server 41 is an email server, a proxy server, or the like. The email server 41 relays and stores emails 43 transmitted and received (exchanged) within the network 40 or over the Internet 42. The proxy server relays web data that are communicated over the Internet 42. The multifunction printer 60 is a device that prints information on paper 61 in response to a printing request from the client 10a or 10b (hereinafter also referred to as "client 10") and scans and saves information printed on the paper 61 as a file. The index server 70 is an apparatus that crawls files stored in the clients 10a and 10b or files or emails stored in the Internet server 41 at regular intervals and indexes the crawled files or emails, thereby allowing users 1a and 1b to quickly search for desired information simply by specifying a search keyword or the like.

In addition, in the information asset management reporting system 100, a portable medium 50 such as a CD-R/DVD-R, a USB flash memory, or a floppy disk can be coupled to the client 10 and the client 10 can exchange files with the portable medium 50.

Here, it is assumed unless otherwise stated that one client 10 is allocated to each user. The client 10 may also be allocated to two or more users. In this case, the client 10 identifies and authenticates each user to determine which user has used the client 10. In the following description, it is assumed for ease of explanation that a user 1a uses the client 10a and a user 1b uses the client 10b to conduct tasks in an organization. It is also assumed that a manager 2 operates the log analysis server 30.

The software architectures of the client (terminal) 10, the log collection server 20, and the log analysis server 30 will now be described with reference to FIG. 1. The client 10 runs a monitoring program 11, which closely monitors and records operation events performed by the user 1 on the client 10, and stores a terminal log 12 created as a record of output of the monitoring program 11. The monitoring program 11 implements a monitoring unit of the client 10 in this embodiment. The log collection server 20 runs a terminal log collection program 21, which implements a log collector for collecting terminal logs 12a and 12b, and stores an integrated log 22 created by the collection of the terminal log collection program 21. The log analysis server 30 runs a correlation analysis program 31, which implements a correlation analyzer for analyzing the integrated log 22 and visualizing the whereabouts of information assets in the organization, and stores an information asset list 32 created by the analysis of the correlation analysis program 31.

There is no need to install the same operating system (OS) on the clients 10a and 10b, and different monitoring programs 11a and 11b may run on different OSs in the clients 10a and 10b. The integrated log 22 created by collecting the terminal logs 12a and 12b needs to have a unified format when different OSs have been installed on the clients 10a and 10b.

The following is a description of the configuration of the client 10 with reference to FIG. 2 which is a block diagram of the client 10. The client 10 includes, as hardware components, a processor (or CPU) 201, a memory 202, a storage device 203, a communicator 204, a display unit 205, an operating unit 206, and a portable medium coupler 207 which are coupled to each other through a bus 208. The processor 201 is a Central Processing Unit (CPU) that controls the client 10 and performs calculation and processing of data. The memory 202 is a main memory device that temporarily stores data or programs in the client 10 and is readable and writable directly by the CPU 201. The storage device 203 stores data or programs to prevent them from being erased when the client 10 is powered off. The communicator 204 communicates with the network 40 by wire or wirelessly. The display unit 205 displays data calculation and processing results on a display or the like to present the results to the user 1. The operating unit 206 receives keyboard or mouse inputs from the user 1. The portable medium coupler 207 is used to read and write data or the like from and to the portable medium 50. The monitoring program 11 is loaded into the memory 202 to be executed by the CPU 201. The terminal log 12 is stored in the storage device 203.

Each of the log collection server 20 and the log analysis server 30 has the same hardware configuration as that of the client 10 shown in the block diagram of FIG. 2. However, each of the log collection server 20 and the log analysis server 30 may not include the portable medium coupler 207. In addition, the integrated log 22 or the information asset list 32 is stored in the storage device 203, and the processor (CPU) 201 runs the terminal log collection program 21 as the terminal log collector and the correlation analysis program 31 as the correlation analyzer. Of course, the log collection server 20 and the log analysis server 30 may be integrated into a single server.

Figure 3:
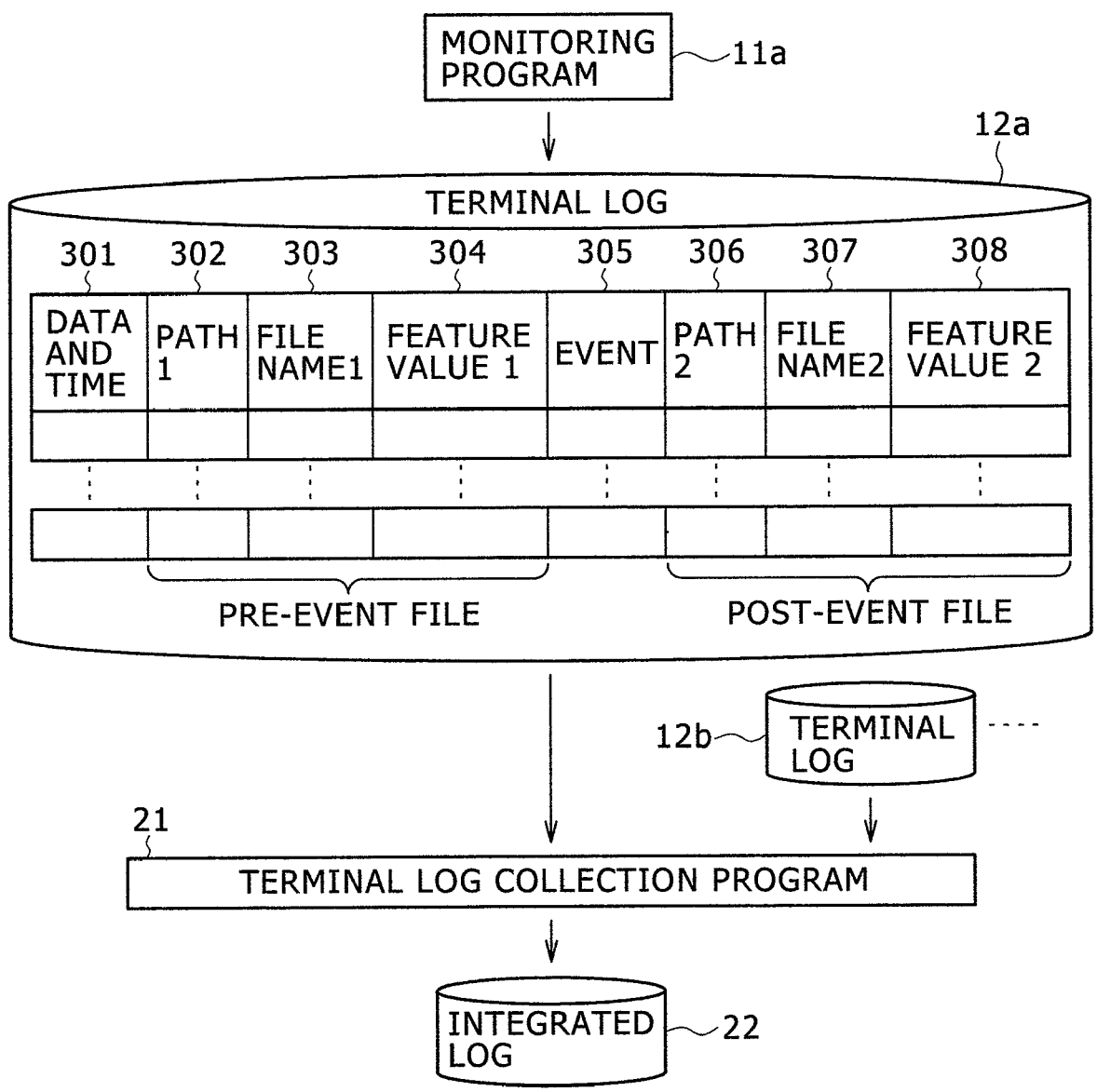
FIG. 3 illustrates data in a terminal log and an integrated log in the first embodiment.
Figure 4:
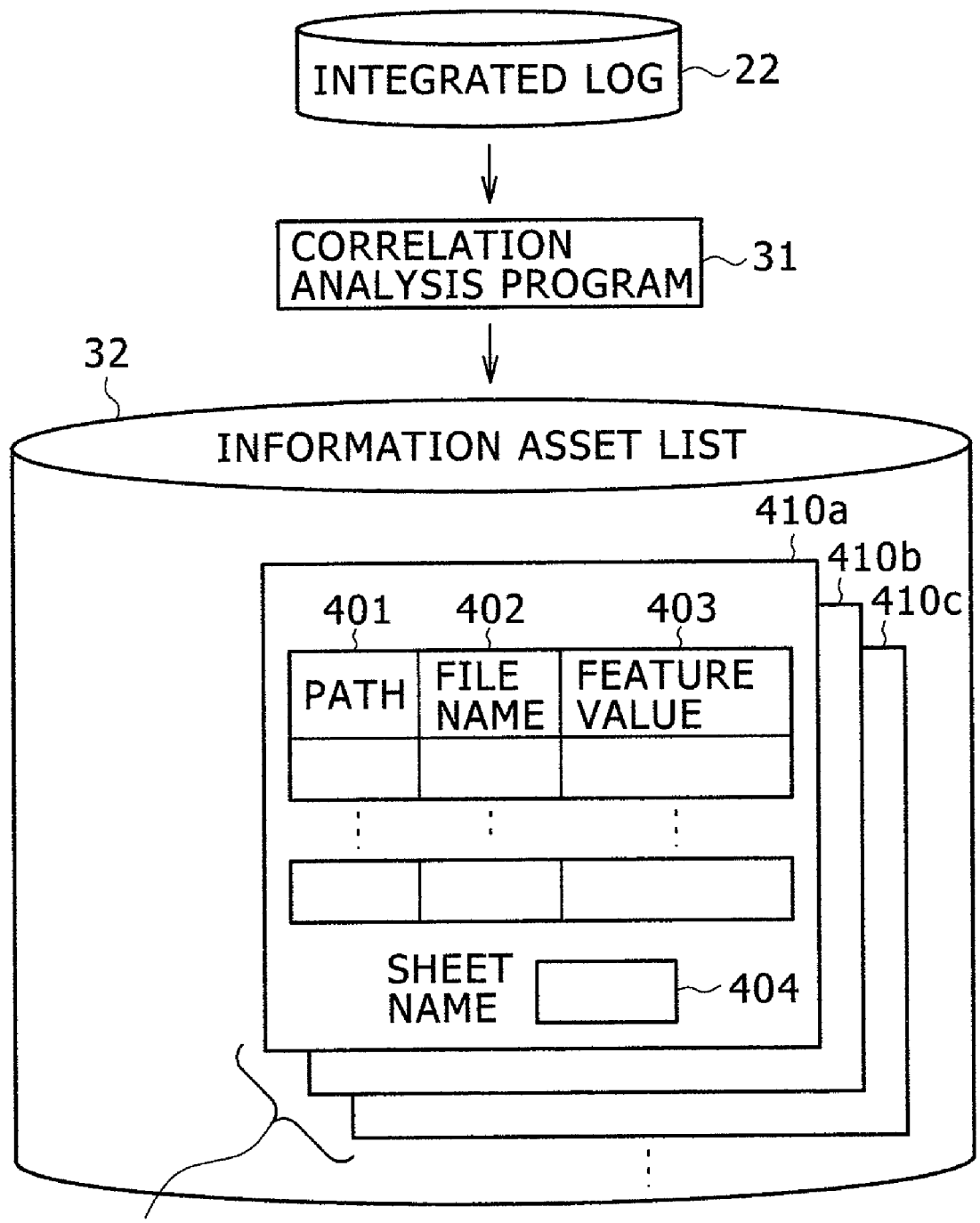
FIG. 4 illustrates data in an information asset list in the first embodiment.

The following is a description of data formats of the terminal log 12, the integrated log 22, and the information asset list 32 with reference to FIGS. 3 and 4.

FIG. 3 illustrates the data formats of the terminal log 12 and the integrated log 22. The terminal log 12 is a record of events such as export or import and file format conversion on the client 10 that the monitoring program 11 has monitored and stored in the storage device 203. The terminal log 12 is table data having zero or more entries, each of which includes a date and time (301) indicating the date and time when an event occurred, a path 1 (302), a file name 1 (303), and a feature value 1 (304), which are pre-event file attributes, an event (305) indicating the type of the event, and a path 2 (306), a file name 2 (307), and a feature value 2 (308) which are post-event file attributes. Each of the path 1 (302) and the path 2 (306) is a path that can be uniquely identified in the network environment of the information asset management reporting system 100 and has, for example, one of the following formats and may also have any other appropriate format.

"computer name"+"drive letter"+"path on hard disk"
"computer name"+"hard disk drive number"+"path on hard disk"
"IP address"+"drive letter"+"path on hard disk"
"IP address"+"hard disk drive number"+"path on hard disk"
"MAC address"+"drive letter"+"path on hard disk"
"MAC address"+"hard disk drive number"+"path on hard disk"

The feature value 1 (304) and the feature value 2 (308) are, for example, outputs of a hash function, such as Message Digest Algorithm 5 (MD5) or Secure Hash Algorithm 1 (SHA1), which outputs fixed-length data for input data to make it difficult to find different input data providing the same output.

The terminal log 12 is recorded for each client. That is, the terminal log 12a is recorded for the client 10a and terminal log 12b is recorded for the client 10b. The terminal log collection program 21 collects the terminal logs 12a and 12b into the integrated log 22. The data format of the integrated log 22 is similar to that of the terminal log 12.

FIG. 4 illustrates the data format of an information asset list 32 stored in a storage device in the log analysis server 30 which corresponds to the storage device 203 of FIG. 2. The information asset list 32 is data of analysis results of the integrated log 22 that the correlation analysis program 31, which implements the correlation analyzer in the log analysis server 30, has obtained by analyzing the integrated log 22 and then has stored in the storage device 203. The information asset list 32 has the same number of different sheets 410a, 410b, and 410c as the number of different information assets, and each of the sheets includes a sheet name 404 and table data having one or more entries, each of which includes a path

401, a file name 402, and a feature value 403. The sheet 410 indicates where and how many identical information assets of the information asset management reporting system 100 are present.

The configuration of the information asset management reporting system 100 and the data formats used in the system have been described above. Now, a flow of operations and example operations of the information asset management reporting system 100 will be described with reference to FIGS. 5 to 11.

Figure 5:
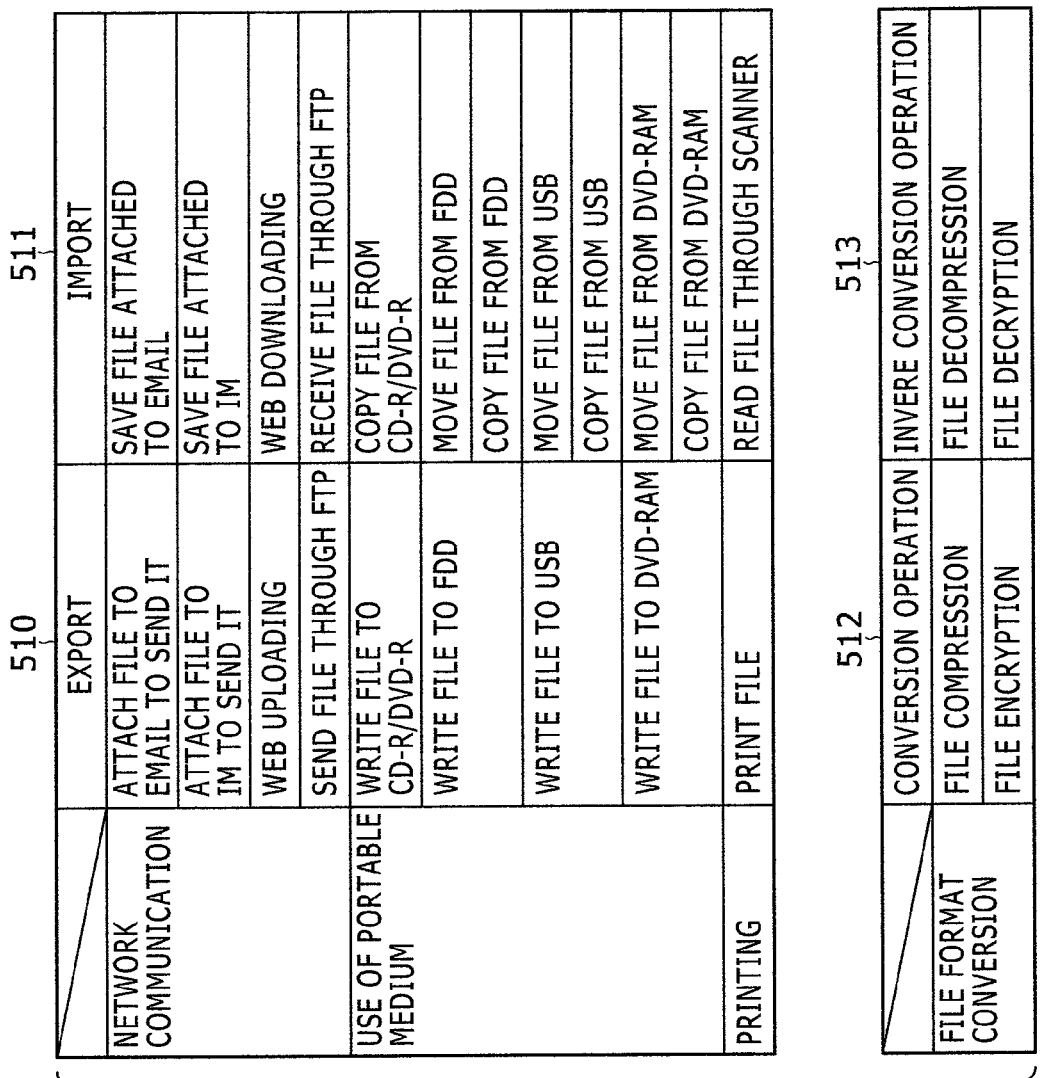
FIG. 5 is a flow chart illustrating the operation of a monitoring program in the first embodiment.

FIG. 5 is a flow chart illustrating the operation of the monitoring program 11 that is executed by the CPU 201 of the client 10. FIG. 5 also illustrates pairs of events that are monitored by the monitoring program 11. When the user 1 powers the client 10 on (step 501), the monitoring program 11 is activated when the OS boots (step 502). The activated monitoring program 502 monitors a variety of events such as network communication, use of portable media, printing, and file format conversion that occur at the client 10 (step 503). The pairs of events can be divided mainly into a pair of an export 510 and an import 511 and a pair of a conversion operation 512 and an inverse conversion operation 513. Here, the export 510 is an event of removing a file from management of the information asset management reporting system 100 which provides a network environment and the import 511 is an event of bringing a file back under management, and the conversion operation 512 is an operation event performed by the user 1 for file format conversion. The monitoring program 11 records the monitored events in a terminal log 12 (step 504). The monitoring program 11 is kept running while the client 10 is on (step 505). If the user 1 shuts the client 10 down, the monitoring program 506 is deactivated (step 506) and the client 10 is powered off (step 507). Through these operations of the monitoring program 11, all events occurring at the client 10 can be recorded in the terminal log 12.

Each pair of events shown in FIG. 5 need not occur in the same client. For example, the export 510 and the import 511 in network communication, of course, may be performed at different clients 10.

Figure 6:
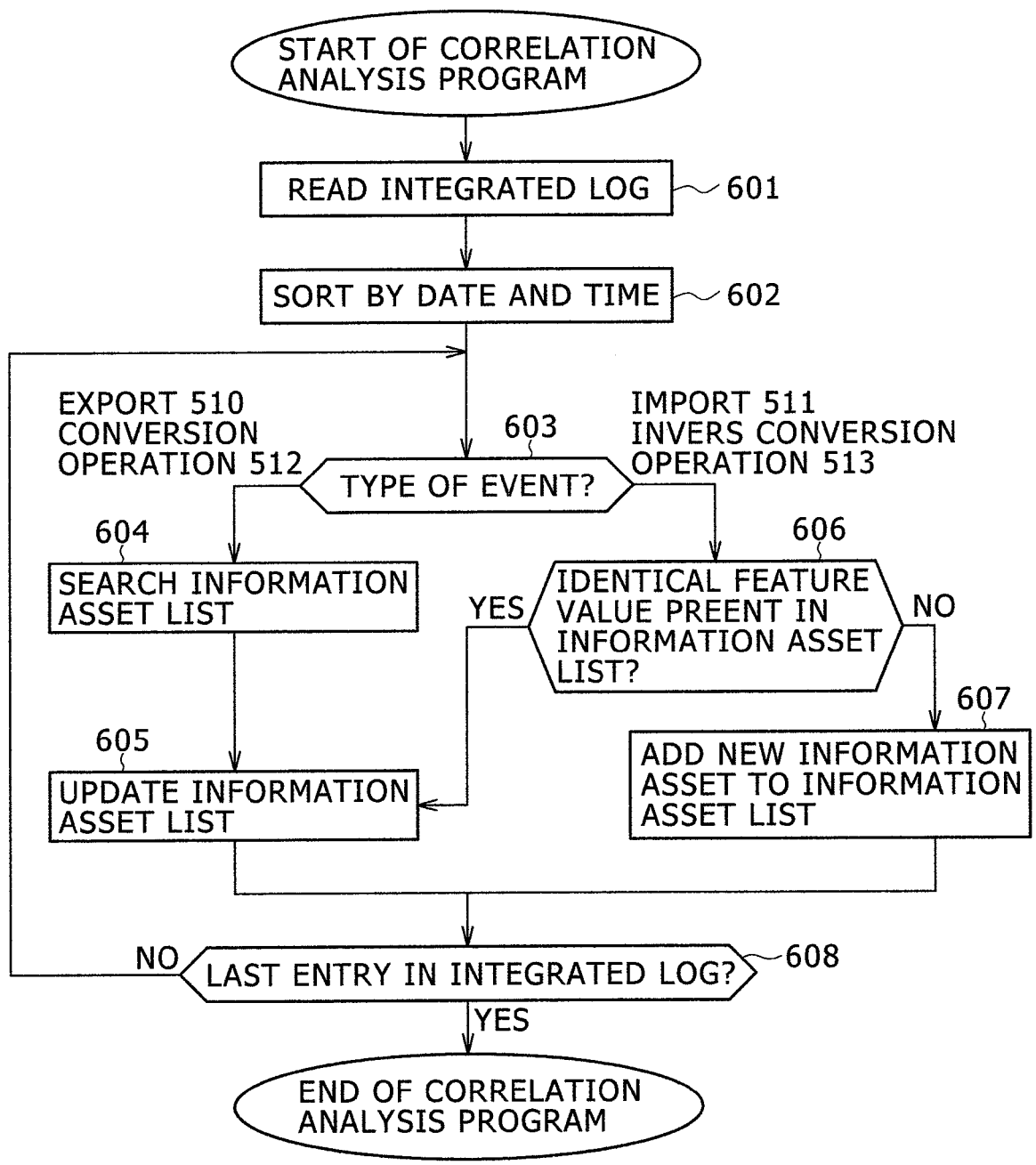
FIG. 6 is a flow chart illustrating the operation of a correlation analysis program in the first embodiment.

FIG. 6 is a flow chart illustrating the operation of the correlation analysis program 31 that functions as a correlation analyzer and is executed by the CPU of the log analyzer server 30. First, the correlation analysis program 31 reads the integrated log 22 from the log collection server 20 (step 601) and sorts entries of the integrated log 22 by the date and time 301 (step 602). The correlation analysis program 31 begins processing the entries of the integrated log 22 sequentially, oldest first. Specifically, the correlation analysis program 31 extracts an entry from the integrated log 22, oldest first, and determines the type of an event 305 in the extracted entry (step 603). If the type of the event 305 of the extracted entry is the export 510 or the conversion operation 512 described above with reference to FIG. 5, the correlation analysis program 31 searches the information asset list 32 for an entry matching both a path 1 (302) and a file name 1 (303), which are pre-event file attributes, in the extracted entry (step 604). The correlation analysis program 31 then updates a sheet 410 including the matching entry in the information asset list 32 with a path 2 (306), a file name 2 (307), and a feature value 2 (308), which are post-event file attributes, in the extracted entry (step 605). On the other hand, if it is determined at step 603 that the type of the event 305 is the import 511 or the inverse conversion operation 513 described above with reference to FIG. 5, the correlation analysis program 31 searches the information asset list 32 for an entry matching the feature value 2 (308), which is one post-event file attribute, in the extracted entry (step 606).

If an entry matching the feature value 2 is found in the information asset list 32 (YES at step 606), the correlation analysis program 31 updates a sheet 410 including the found entry in the information asset list 32 in the same manner as at step 605. If no entry matching the feature value 2 is found (NO at step 606), the correlation analysis program 31 adds a new sheet 410 including the path 2 (306), the file name 2 (307), and the feature value 2 (308) which are post-event file attributes, as a new information asset, to the information asset list 32 (step 607). When the processing of the entry extracted from the integrated log 22 is completed as described above, the correlation analysis program 31 returns to step 603 to perform processing of the next entry until processing of all entries of the integrated log 22 is completed (step 608). Through these operations of the correlation analysis program 31, it is possible to determine the whereabouts of information assets in the information asset management reporting system 100 or to determine whether or not information assets have been widely distributed, exposing them to risk.

Although, if no entry matching the feature value 2 is found in the information asset list 32, the correlation analysis program 31 adds a new sheet 410 including the path 2 (306), the file name 2 (307), and the feature value 2 (308), as a new information asset, to the information asset list 32 at step 607 in this example, the new information asset may be stored and managed in a database different from the information asset list 32. Alternatively, the new information asset may not be stored in any database.

Specific events, and specific operations of the monitoring program 11 and the correlation analysis program 31 according to the events will now be described with reference to FIGS. 7 to 9.

Figure 7:
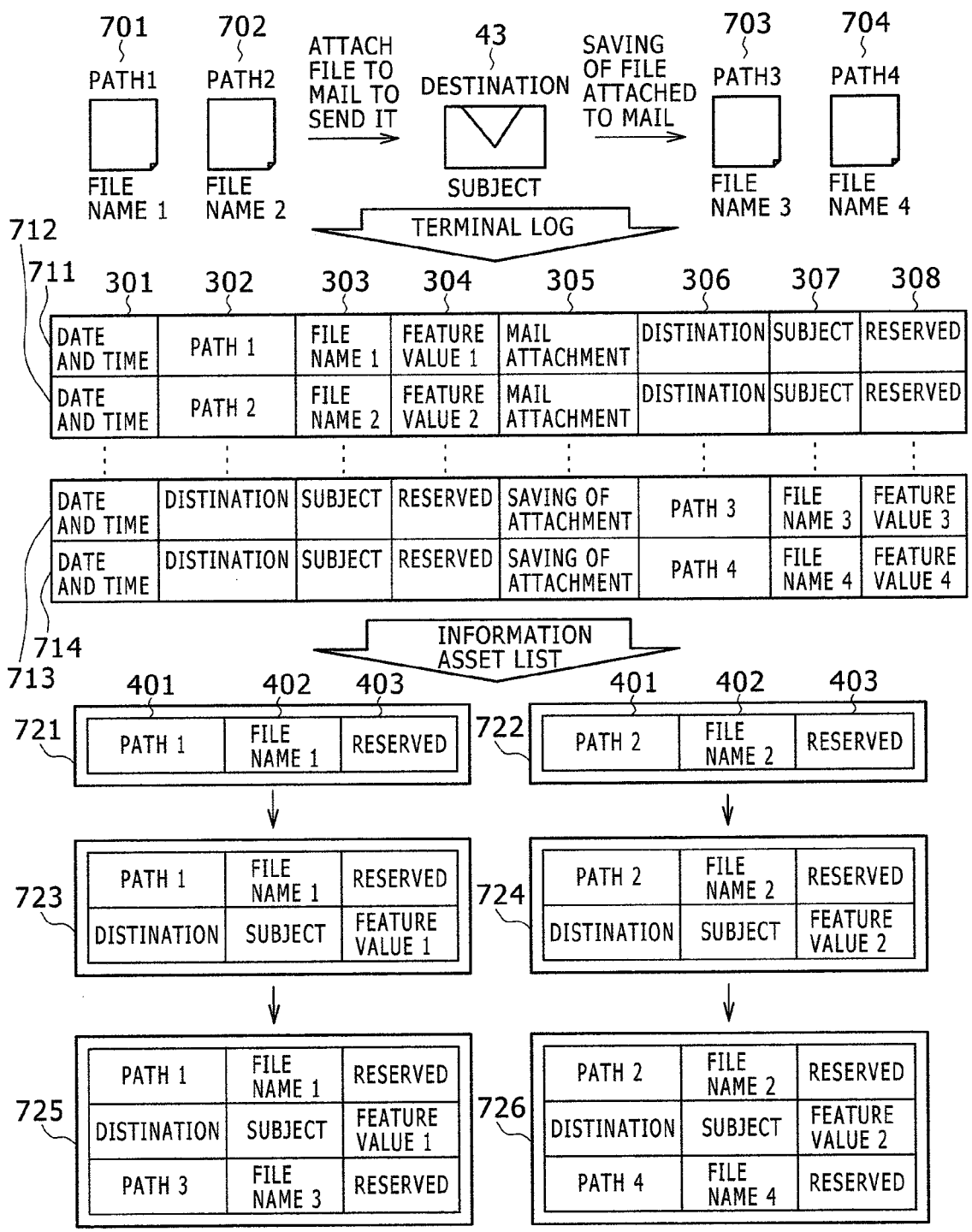
FIG. 7 illustrates an example of log analysis in association with network communication in the first embodiment.

FIG. 7 illustrates an example of network communication where a file is attached to an email and the attached file is saved. Multiple files can be attached to a single email, and it is assumed in this example that the user 1a has attached both a file 701 and a file 702 to an email 43. Here, the monitoring program 11a calculates a feature value 1 of the file 701 and records an entry 711, indicating that the file 701 having the feature value 1 has been attached to the email, in a terminal log 12a and calculates a feature value 2 of the file 702 and records an entry 712, indicating that the file 702 having the feature value 2 has been attached to the email, in the terminal log 12a.

At the receiving side of the email 43, a file 703 having a path 3 and a file name 3 and a file 704 having a path 4 and a file name 4 are generated when the user 1b has saved the files 701 and 702 attached to the email 43. Here, the monitoring program 11b calculates a feature value 3 of the file 703 and records an entry 713, indicating that the file 703 having the feature value 3 has been saved, in a terminal log 12b and calculates a feature value 4 of the file 704 and records an entry 714, indicating that the file 704 having the feature value 4 has been saved, in the terminal log 12b. The terminal log collection program 21 collects the terminal log 12a and the terminal log 12b and aggregates them into an integrated log 22.

The correlation analysis program 31 reads the integrated log 22 and analyzes the whereabouts of information assets. Prior to this analysis, it is assumed that a sheet 721 indicating the whereabouts of the file 701 and a sheet 722 indicating the whereabouts of the file 702 have already been stored in the information asset list 32. When the correlation analysis program 31 reads the entry 711, the correlation analysis program 31 finds an entry in the sheet 721 which matches pre-event file attributes (path 1 and file name 1) in the entry 711, since the type of the event 305 is an export "attachment to email". The correlation analysis program 31 then adds post-event file attributes to the sheet 721 to update the sheet 721 with a sheet 723 indicating that the information asset having the feature value 1 is also present in an email as shown in FIG. 7. Similarly, when the correlation analysis program 31 reads the entry 712, the correlation analysis program 31 updates the sheet 722 with a sheet 724 indicating that the information asset having the feature value 2 is also present in an email as shown in FIG. 7.

In addition, when the correlation analysis program 31 reads the entry 713, the correlation analysis program 31 finds an entry in the sheet 723 which includes an element identical to a post-event file attribute (feature value 3) in the entry 713, since the type of the event 305 is an import "saving of attachment". The correlation analysis program 31 then adds post-event file attributes (path 3 and file name 3), which are generated as the file attached to the mail is saved, to the sheet 723 to update the sheet 723 with a sheet 725 indicating that the identical information assets are stored in the same sheet as shown in FIG. 7. Similarly, when the correlation analysis program 31 reads the entry 714, the correlation analysis program 31 updates the sheet 724 with a sheet 726 indicating that the identical information assets are stored in the same sheet as shown in FIG. 7.

As is apparent from the above description, through the event monitoring and recording of the monitoring program 11 and the analysis of the correlation analysis program 31 for attachment of a file to an email and saving of the attached file, it is possible to easily determine where and how many information assets (files) of the information asset management reporting system 100 including attachments to emails are present. Although the example of FIG. 7 has been described only for the case where a file is attached to an email and the attached file is saved, it is also possible to track information assets in other cases such as attachment of a file to an Instant Message (IM) and saving of the file attached to the IM, web uploading and downloading, and sending and receiving of a file through FTP.

Figure 8:
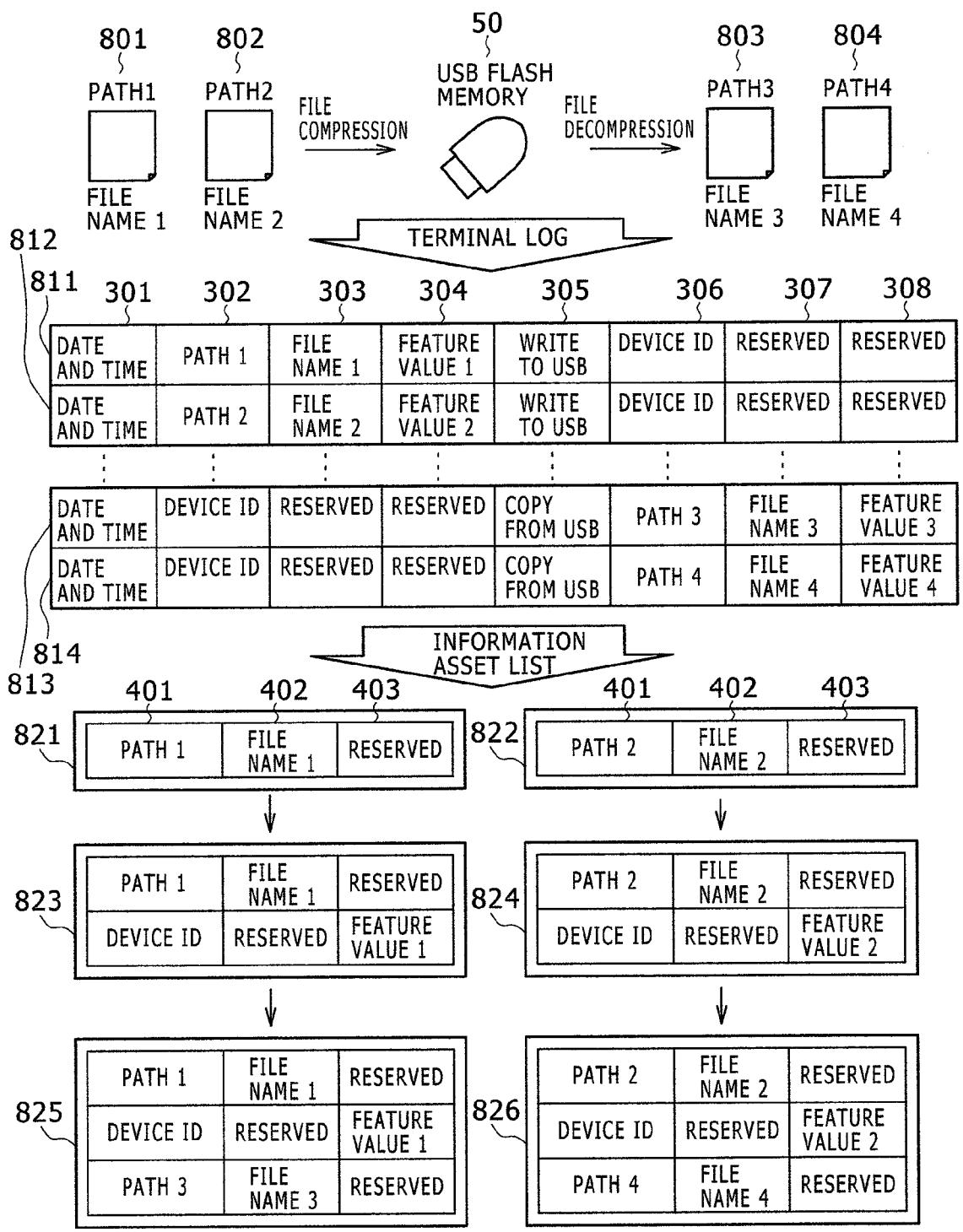
FIG. 8 illustrates an example of log analysis in association with use of a portable medium in the first embodiment.

FIG. 8 illustrates an example of the use of a portable medium where a file is written to a USB flash memory and the file is copied from the USB flash memory. Multiple files can be written to a USB flash memory, and it is assumed in this example that the user 1a has written both a file 801 having a path 1 and a file name 1 and a file 802 having a path 2 and a file name 2 to a USB flash memory 50. Here, the monitoring program 11a calculates a feature value 1 of the file 801 and records an entry 811, indicating that the file 801 having the feature value 1 has been written to the USB flash memory 50 having a unique device ID, in a terminal log 12a and calculates a feature value 2 of the file 802 and records an entry 812, indicating that the file 802 having the feature value 2 has been written to the USB flash memory 50 having the unique device ID, in the terminal log 12a.

A file 803 having a path 3 and a file name 3 and a file 804 having a path 4 and a file name 4 are generated at the client 10b when the user 1b has copied the files from the USB flash memory 50 to the client 10b. Here, the monitoring program 11b calculates a feature value 3 of the file 803 and records an entry 813, indicating that the file 803 having the feature value 3 has been copied to the client 10b, in a terminal log 12b and calculates a feature value 4 of the file 804 and records an entry 814, indicating that the file 804 having the feature value 4 has been copied to the client 10b, in the terminal log 12b. The terminal log collection program 21 collects the terminal log 12a and the terminal log 12b and aggregates them into an integrated log 22.

The correlation analysis program 31 reads the integrated log 22 and analyzes the whereabouts of information assets. Prior to this analysis, it is assumed that a sheet 821 indicating the whereabouts of the file 801 and a sheet 822 indicating the whereabouts of the file 802 have already been stored in the information asset list 32. When the correlation analysis program 31 reads the entry 811, the correlation analysis program 31 finds an entry in the sheet 821 which matches pre-event file attributes (path 1 and file name 1) in the entry 811, since the type of the event 305 is an export "writing to USB flash memory". The correlation analysis program 31 then adds post-event file attributes to the sheet 821 to update the sheet 821 with a sheet 823 indicating that the information asset having the feature value 1 is also included in the USB flash memory having the unique device ID as shown in FIG. 8. Similarly, when the correlation analysis program 31 reads the entry 812, the correlation analysis program 31 updates the sheet 822 with a sheet 824 indicating that the information asset having the feature value 2 is also included in the USB flash memory having the unique device ID as shown in FIG. 8.

In addition, when the correlation analysis program 31 reads the entry 813, the correlation analysis program 31 finds an entry in the sheet 823 which includes an element identical to a post-event file attribute (feature value 3) in the entry 813, since the type of the event 305 is an import "copying from USB flash memory". The correlation analysis program 31 then adds post-event file attributes (path 3 and file name 3), which are new file attributes generated as the file is copied to the client 10b, to the sheet 823 to update the sheet 823 with a sheet 825 indicating that the identical information assets are stored in the same sheet as shown in FIG. 8. Here, it can also be considered that the contents of the file written to the USB flash memory 50 have been changed. In this case, since the feature value has also been changed, the correlation analysis program 31 adds a new sheet 410 to the information asset list 32 and manages the information asset (i.e., post-event file attributes) in the new sheet 410 as described above at step 607 in FIG. 6. Similarly, when the correlation analysis program 31 reads the entry 814, the correlation analysis program 31 updates the sheet 824 with a sheet 826 indicating that the identical information assets are stored in the same sheet as shown in FIG. 8.

As is apparent from the above description, through the event monitoring and recording of the monitoring program 11 and the analysis of the correlation analysis program 31 for writing of a file to a USB flash memory and copying of the file from the USB flash memory, it is possible to easily determine where and how many information assets (files) of the information asset management reporting system 100 including USB flash memories are present. Although the example of FIG. 8 has been described only for the case where the USB flash memory is used, it is also possible to track information assets when any other portable medium such as a floppy disk, a CD-R/DVD-R, or a DVD-RAM is used.

Figure 9:
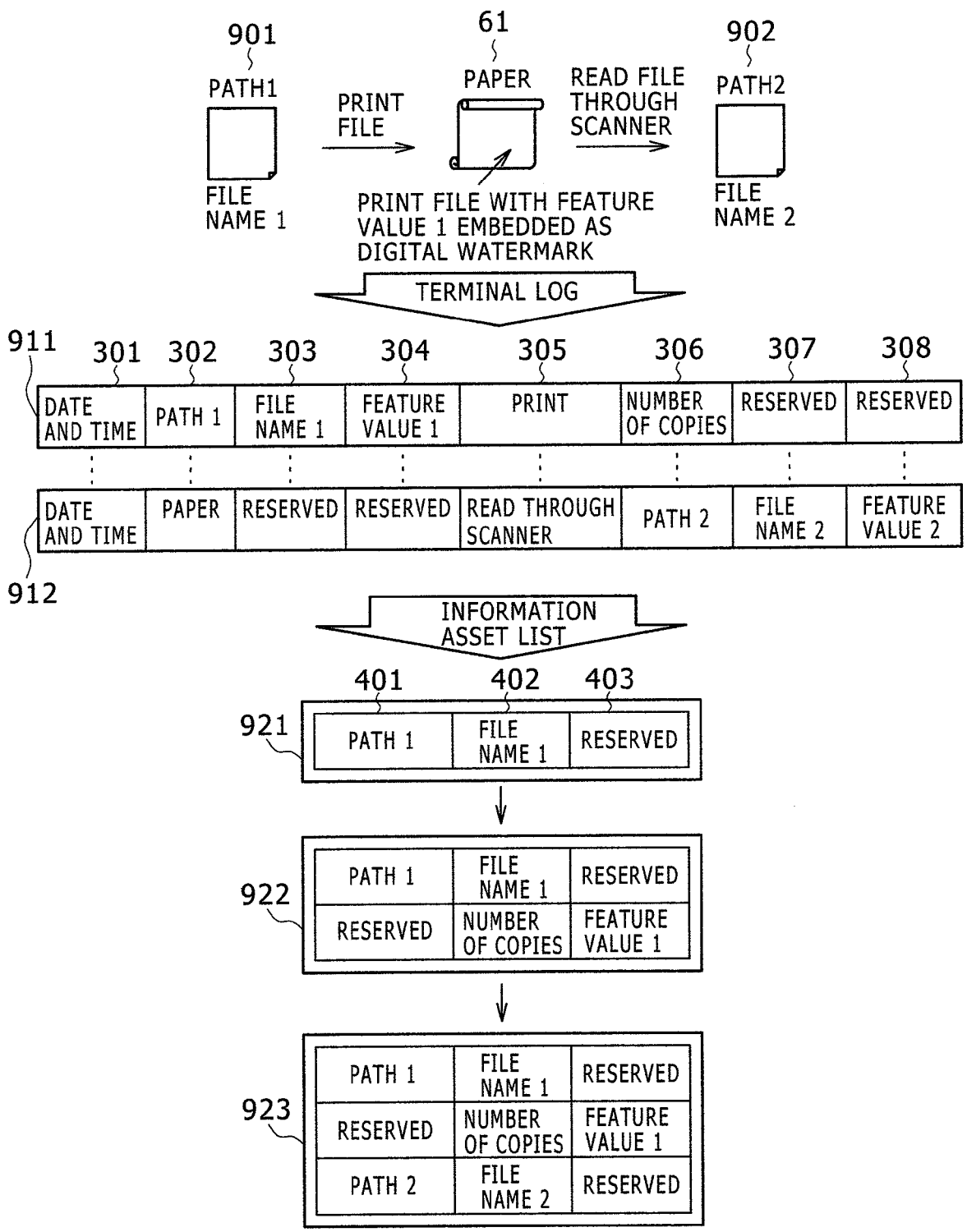
FIG. 9 illustrates an example of log analysis in association with printing in the first embodiment.

FIG. 9 illustrates an example of printing where a file is printed on paper and the file printed on the paper is scanned. It is assumed in this example that the user 1a has printed a file 901 having a path 1 and a file name 1 on paper 61 and the user 1b has scanned the paper 61 and then saved the scanned data as a file 902 having a path 2 and a file name 2. Here, the monitoring program 11a calculates a feature value 1 of the file 901 and records an entry 911 indicating that the file 901 having the feature value 1 has been printed, together with the number of copies, in a terminal log 12a. For example, when a file is printed on paper, the monitoring program 11a embeds the feature value 1 as a digital watermark into the file as described in Japanese Patent Application Publication No. 2006-2794640 entitled "INFORMATION EMBEDDING APPARATUS, PRINT MEDIUM, AND INFORMATION READING APPARATUS". When the user 1*b* has scanned the file data printed on the paper, the monitoring program 11*b* detects the embedded digital watermark as described in this publication and records, in a terminal log 12*b*, an entry 912 including a detected feature value 2 when the file 902 is saved. The terminal log collection program 21 collects the terminal log 12*a* and the terminal log 12*b* and aggregates them into an integrated log 22.

The correlation analysis program 31 reads the integrated log 22 and analyzes the whereabouts of information assets. Prior to this analysis, it is assumed that a sheet 921 indicating the whereabouts of the file 901 has already been stored in the information asset list 32. When the correlation analysis program 31 reads the entry 911, the correlation analysis program 31 finds an entry in the sheet 921 which matches pre-event file attributes (path 1 and file name 1) in the entry 911, since the type of the event 305 is an export "printing". The correlation analysis program 31 then adds post-event file attributes to the sheet 921 to update the sheet 921 with a sheet 922 indicating that the information asset having both the feature value 1 and the number of copies is included in the paper as shown in FIG. 9. When the correlation analysis program 31 reads the entry 912, the correlation analysis program 31 finds an entry in the sheet 922 which includes an element identical to a post-event file attribute (feature value 2) in the entry 912, since the type of the event 305 is an import "scanning". The correlation analysis program 31 then adds post-event file attributes (path 2 and file name 2) of the file 902, which saves the scanned data, to the sheet 922 to update the sheet 922 with a sheet 923 indicating that the identical information assets are stored in the same sheet as shown in FIG. 9.

As is apparent from the above description, through the event monitoring and recording of the monitoring program 11 and the analysis of the correlation analysis program 31 for printing and scanning of a file, it is possible to easily determine where and how many information assets (files) of the information asset management reporting system 100 including those printed on paper are present. Accordingly, it is also possible to track information assets when the information assets have been printed or scanned.

Figure 10:
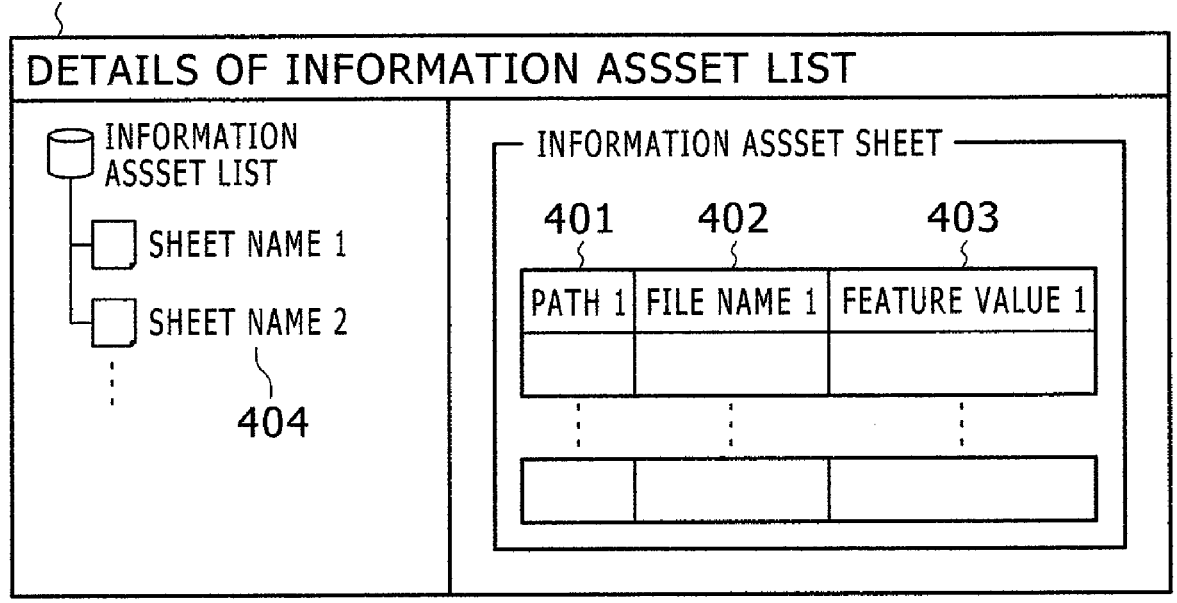
FIG. 10 illustrates an example of a screen interface which displays an information asset list in the first embodiment.

The operation of the information asset management reporting system 100 has been described above with reference to specific examples. FIG. 10 illustrates an example of a screen interface which displays an information asset list 32 to a manager 2 at the log analysis server 30.

The sheets 410*a*, 410*b*, and 410*c* shown in FIG. 4 are displayed in a tree format in a left region of the screen interface 1001 that displays the information asset list 32, and the sheet names 404 shown in FIG. 4 are also displayed as the respective names of the sheets. The manager 2 can edit the sheet names 404 on the screen interface 1001. When the manager 2 selects one sheet 410 from the tree in the left region through a mouse click or the like, a list of information assets included in the sheet 410 is displayed in a right region of the screen interface 1001.

Figure 11:
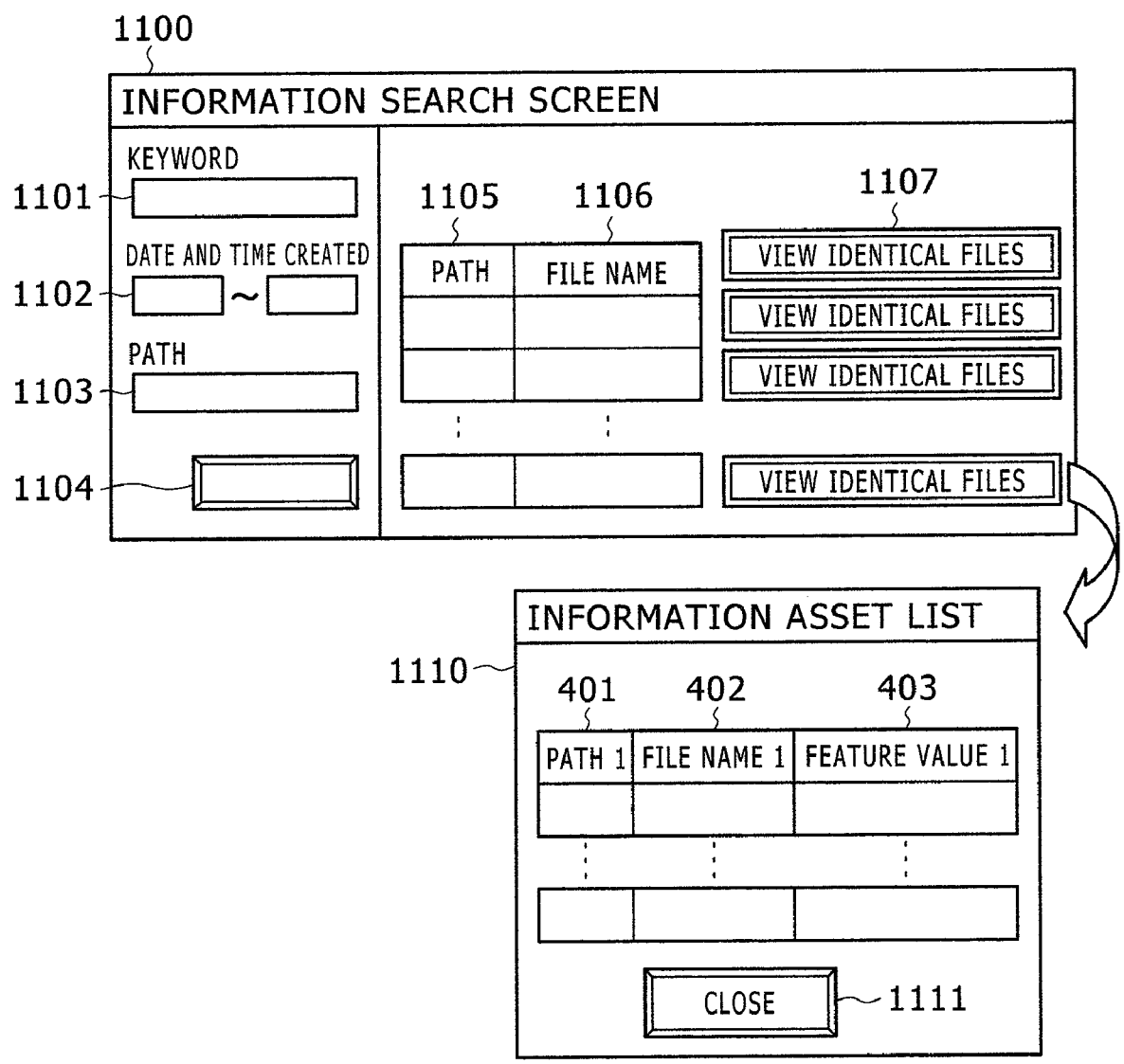
FIG. 11 illustrates another example of a screen interface which displays an information asset list in the first embodiment.

The screen interface for displaying the information asset list 32 may also be implemented as shown in FIG. 11. A screen interface 1100 shown in FIG. 11 is realized through cooperation of the log server 30 and the index server 70. The index server 70 provides an interface, for example through a web browser, and can be used not only by the manager 2 but also by the user 1.

The screen interface 1100 includes a left region where search conditions are entered and a right region where search results are displayed. A keyword 1101, an information creation date and time 1102, or a path 1103 can be specified as a search condition. When a search button 1104 is pressed, the log server 70 searches indexed information and displays paths 1105 and file names 1106 as a search result in the right region and also displays a button 1107 for viewing identical files. Other search conditions may also be provided. For example, a file hash value or a USB flash memory device ID can be specified as a search condition.

When the view-identical-files button 1107 is pressed, the log server 30 retrieves files, which are identical to a file identified by both the path 1105 and the file name 1106, from the information asset list 32 and displays the retrieved files in an information asset list dialog box 1110. A "close" button for closing the dialog box 1110 is also displayed in the dialog box 1110.

Using the screen interface 1001 shown in FIG. 10, the manager 2 can easily and correctly determine the whereabouts of information assets in an organization. In addition, using the screen interface 1100 shown in FIG. 11, the manager 2 or the user 1 can retrieve specific information assets and can also easily and correctly determine the whereabouts of files identical to the retrieved information assets.

Reference will now be made to an information asset management reporting system according to the second embodiment which has the same configuration as the information asset management reporting system 100 according to the first embodiment described above while it can track information assets even when they have undergone file format changes such as file decompression or encryption.

Figure 12:
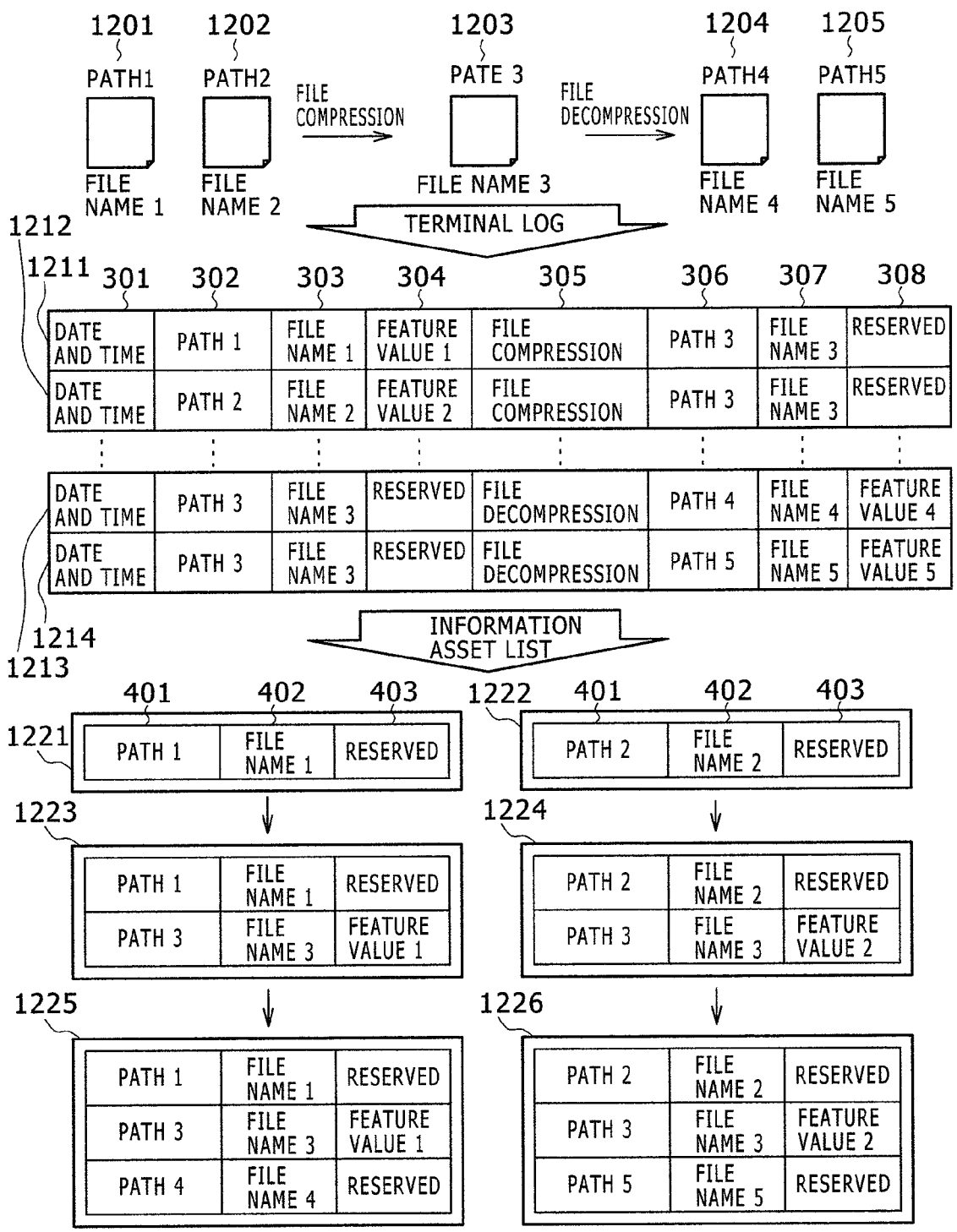
FIG. 12 illustrates an example of log analysis in association with file format conversion in a second embodiment of the invention.

FIG. 12 illustrates example file compression and decompression as an example of file format conversion. The file compression is a process of compressing one or more files to archive them into a single file. It is assumed in this example that the user 1*a* has compressed both a normal file 1201 having a path 1 and a file name 1 and a normal file 1202 having a path 2 and a file name 2 into a compressed file 1203 having a path 3 and a file name 3. Here, the monitoring program 11*a* calculates a feature value 1 of the normal file 1201 and records an entry 1211, indicating that the normal file 1201 having the feature value 1 has been compressed, in a terminal log 12*a* and calculates a feature value 2 of the normal file 1202 and records an entry 1212, indicating that the normal file 1202 having the feature value 2 has been compressed, in the terminal log 12*a*.

A normal file 1204 having a path 4 and a file name 4 and a normal file 1205 having a path 5 and a file name 5 are generated when the user 1*b* has decompressed the compressed file 1203. Here, the monitoring program 11*b* calculates a feature value 4 of the normal file 1204 and records an entry 1213, indicating that the normal file 1204 having the feature value 4 has been decompressed, in a terminal log 12*b* and calculates a feature value 5 of the normal file 1205 and records an entry 1214, indicating that the normal file 1205 having the feature value 5 has been decompressed, in the terminal log 12*b*. The terminal log collection program 21 collects the terminal log 12*a* and the terminal log 12*b* and aggregates them into an integrated log 22.

The correlation analysis program 31 reads the integrated log 22 and analyzes the whereabouts of information assets. Prior to this analysis, it is assumed that a sheet 1221 indicating the whereabouts of the normal file 1201 and a sheet 1222 indicating the whereabouts of the normal file 1202 have already been stored in the information asset list 32. When the correlation analysis program 31 reads the entry 1211, the correlation analysis program 31 finds an entry in the sheet 1221 which matches pre-event file attributes (path 1 and file name 1) in the entry 1211, since the type of the event 305 is a conversion operation "file compression". The correlation analysis program 31 then adds post-event file attributes to the sheet 1221 to update the sheet 1221 with a sheet 1223 indicating that the information asset having the feature value 1 is also included in the compressed file as shown in FIG. 7. Similarly, when the correlation analysis program 31 reads the entry 1212, the correlation analysis program 31 updates the sheet 1222 with a sheet 1224 indicating that the information asset having the feature value 2 is also included in the compressed file as shown in FIG. 7.

In addition, when the correlation analysis program 31 reads the entry 1213, the correlation analysis program 31 finds an entry in the sheet 1223 matching a post-event file attribute (feature value 4) in the entry 1213, since the type of the event 305 is an inverse conversion operation "file decompression." The correlation analysis program 31 then adds post-event file attributes (path 4 and file name 4), which are generated as the file is decompressed, to the sheet 1223 to update the sheet 1223 with a sheet 1225 indicating that the identical information assets are stored in the same sheet as shown in FIG. 12. Similarly, when the correlation analysis program 31 reads the entry 1214, the correlation analysis program 31 updates the sheet 1224 with a sheet 1226 indicating that the identical information assets are stored in the same sheet as shown in FIG. 12.

As is apparent from the above description, through the event monitoring and recording of the monitoring program 11 and the analysis of the correlation analysis program 31 for compression of a file and decompression of the file, it is possible to easily determine where and how many information assets (files) of the information asset management reporting system 100 including compressed files are present. Although the example of FIG. 12 has been described only for the case of file compression and decompression, it is also possible to perform event monitoring and log analysis in the same manner in other cases such as encryption and description of a file.

Reference will now be made to an information asset management reporting system according to the third embodiment which can prevent any unauthorized use of files and protect lost or stolen files even if a portable medium is coupled to a private PC and files are then improperly copied from the portable medium to the PC or if a portable medium is lost or stolen or if a portable medium is coupled to a PC not under management of the network environment for improperly using files in the portable medium.

Figure 13:
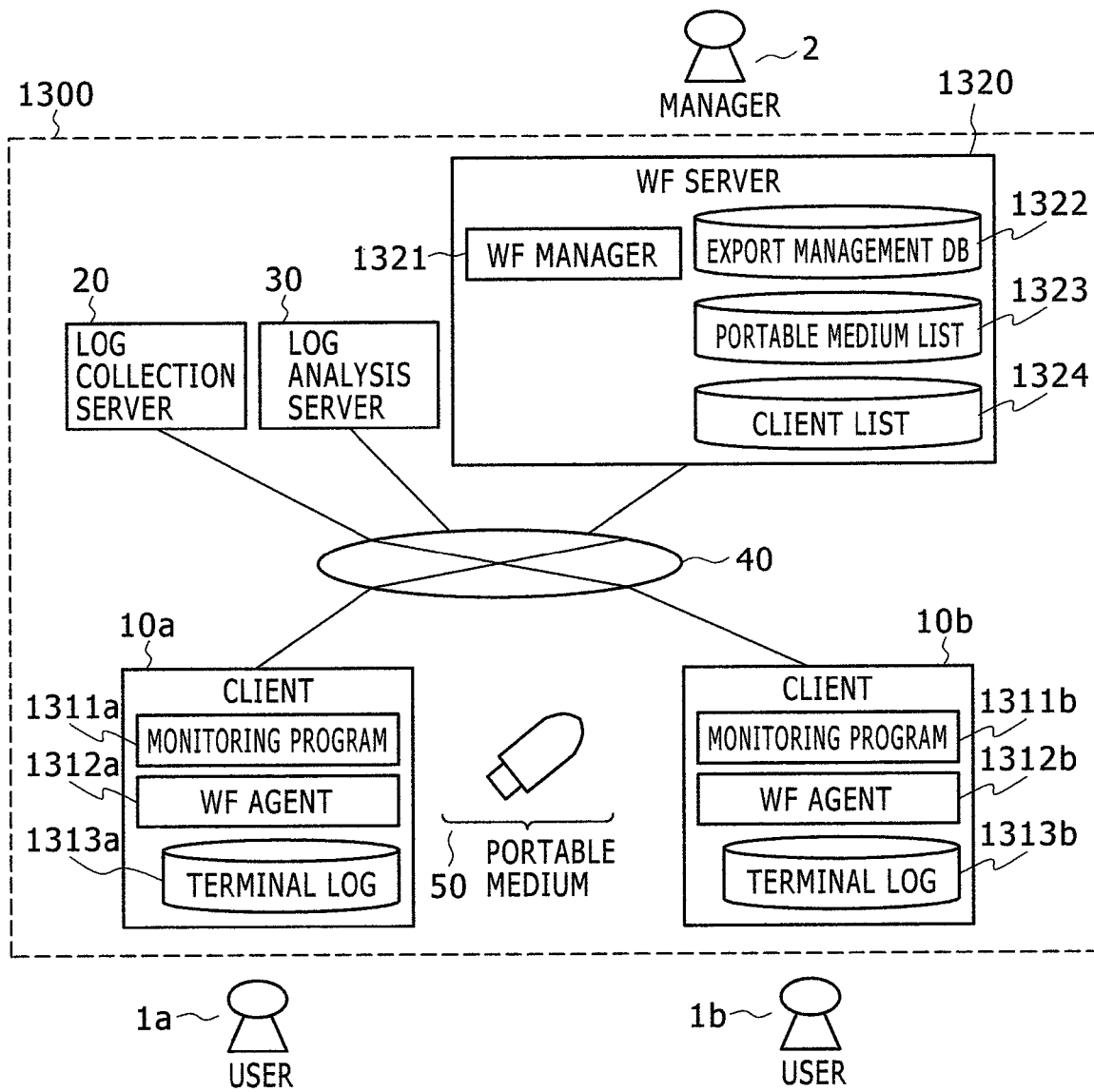
FIG. 13 illustrates the overall configuration of an information asset management reporting system according to a third embodiment of the invention.

FIG. 13 illustrates the overall configuration of an information asset management reporting system 1300 according to the third embodiment. The information asset management reporting system 1300 includes a client 10 and a Work Flow (WF) server 1320. The WF server 1320 includes a WF manager 1321 running on the server 1320 and includes an export management database 1322, a portable medium list 1323, and a client list 1324 that are stored as databases in the server 1320. The client 10 includes a monitoring program 1311 and a WF agent 1312 running on the client 10 and includes a terminal log 1313 stored in the client 10. The other components such as the log collection server 20 and the log analysis server 30 are identical to those of the information asset management reporting system according to the first embodiment described above. The network 40 is not limited to an in-house network and may be the Internet. Of course, the client 10 has the same internal configuration as that shown in FIG. 2. The terminal log 1313 is stored in the storage device 203 which implements a storage unit of the client 10. Similar to the monitoring program 1311, the WF agent 1312 runs on the CPU 201 which is a processor of the client 10. The WF server 1320 also has the same hardware configuration as that of the client 10 shown in FIG. 2.

Figure 14:
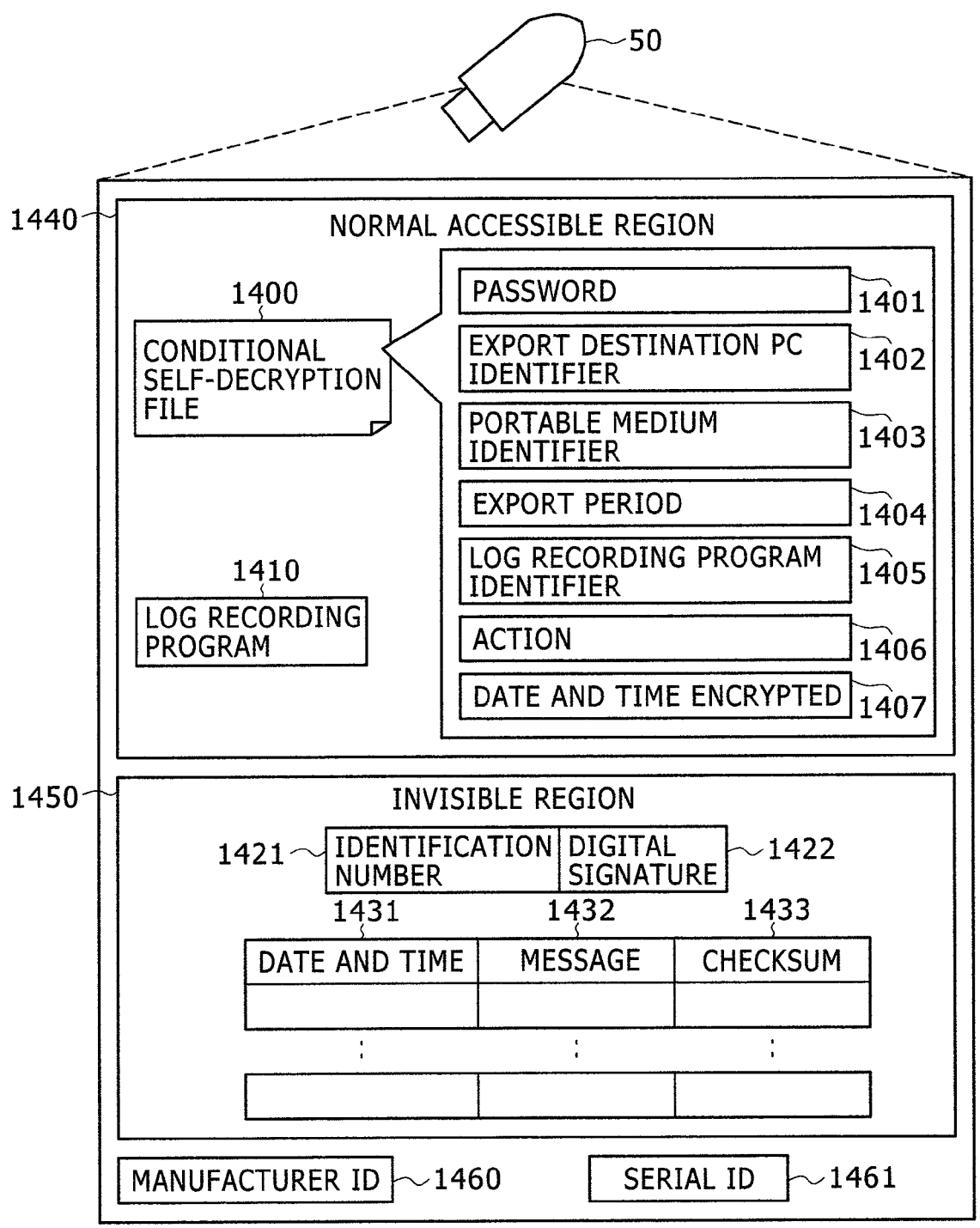
FIG. 14 is a block diagram illustrating a portable medium in the third embodiment.

The configuration of the portable medium 50 will now be described with reference to FIG. 14 which is a block diagram of the portable medium 50. Specifically, the portable medium 50 is a readable/writable portable storage device such as a USB flash memory, a compact flash memory card, or a memory stick. This portable medium 50 includes a normal accessible region 1440 and an invisible region 1450. The normal accessible region 1440 is a region that is allocated to allow the user to read and write a file through the OS (i.e., a region that is defined as a partition) and the invisible region 1450 that is not allocated as a partition and is invisible to the OS. The invisible region 1450 is used as a region for writing a log. One example of the writing method is to write the log directly in sector units in the region. The log includes a date and time 1431, a message 1432, and a checksum 1433. The checksum 1433 is used to check whether or not the date and time 1431 and the message 1432 have been altered (or tampered). Accordingly, the invisible region 1450 cannot be read even when the portable medium 50 is read from the client using Windows Explorer or the like, and thus it is not possible to alter or delete the log using general methods. In order to set the size of the invisible region 1450 greater than a specific size, the manager may collectively set the size of the normal accessible region 1440 of each portable medium 50 purchased in an organization to be less than the original size and then distribute the portable media 50 to users.

Alternatively, the invisible region 1450 may be a tamper-resistant region of the portable medium 50. All of the date and time 1431, the message 1432, and the checksum 1433 or only the checksum 1433 may be arranged in the tamper-resistant region. Whether all of the date and time 1431, the message 1432, and the checksum 1433 or only the checksum 1433 is arranged in the tamper-resistant region may be determined according to the size of the tamper-resistant size. For example, verification of secret information called a "Personal Identification Number (PIN)" may be required as a condition for granting access to the tamper-resistant region or alternatively the tamper-resistant region may be accessed exclusively from a dedicated driver.

In addition, the date and time 1431, the message 1432, and the checksum 1433 may be written to the normal accessible region 1440 as a file which can be encrypted and decrypted only by a log recording program 1410. The log recording program 1410 opens a file handle in exclusive mode when the log file is opened, thereby preventing other programs from altering or deleting the log while the log recording program 1410 is running.

Generally, the portable medium 50 is assigned a serial number or the like by a manufacturer. Specifically, the portable medium 50 is assigned a manufacturer ID 1460 and a serial ID 1461 which cannot be changed. The portable medium 50 is uniquely identified using the manufacturer ID and all portable media 50 present in the organization are managed in the portable medium list 1323.

Alternatively, an identification number 1421 and a digital signature 1422 may be written to the invisible region 1450 so that the portable medium 50 is uniquely identified in the case where the portable medium 50 does not have the manufacturer ID 1460 and the serial ID 1461 or where the portable medium 50 has the manufacturer ID 1460 and the serial ID 1461 which cannot be read by a PC. The manager collectively assigns the identification number 1421 and the digital signature 1422 to each portable medium 50 purchased in an organization before distributing the portable media 50 to users.

This makes it possible to distinguish between the portable media 50 lent by the organization and media individually purchased by users.

The log recording program 1410 is stored in the normal accessible region 1440. The log recording program 1410 is a program for writing a log in the invisible region 1450. The log recording program 1410 may be copied to the portable medium 50 when the portable medium 50 is registered in the portable medium list 1323 of the WF server 1320. Alternatively, the log recording program 1410 may be stored in a read-only region on the portable medium which has properties similar to those of a CD-ROM.

A file in a conditional self-decodable format (conditional self-decryption file) 1400 stored in the normal accessible region 1440 will now be described with reference to FIG. 14. The file format of the conditional self-decryption file 1400 is a format for writing to the portable medium 50. The conditional self-decryption file 1400 includes a variety of information described below.

- Password 1401: Secret information allowing only the user 1 to decrypt the file.
- Export Destination PC Identifier 1402: Information registered in the client list 1324 for uniquely identifying the client 10. For example, this information is a certificate which contains a machine name, a MAC address, an HDD serial number, an OS license number, OS owner information, a mail address, a login user name, an IP address, a motherboard hardware number, a CPU type, a BIOS type, and a Trusted Platform Module (TPM) chip.
- Portable Medium Identifier 1403: Information registered in the portable medium list 1323 for uniquely identifying the portable medium 50.
- Export Period 1404: Information indicating the period during which export is granted.
- Log Recording Program Identifier 1405: Information uniquely identifying the log recording program 1410. Examples of this information include the name of the program and the hash value of the program file.
- Action 1406: Information indicating an action that is performed when conditions for decryption are not satisfied. Examples of this action include prohibition of decryption, and forced deletion.
- Encryption Date and Time 1407: Information indicating the date and time when the conditional self-decryption file 1400 was created.

Figure 18:
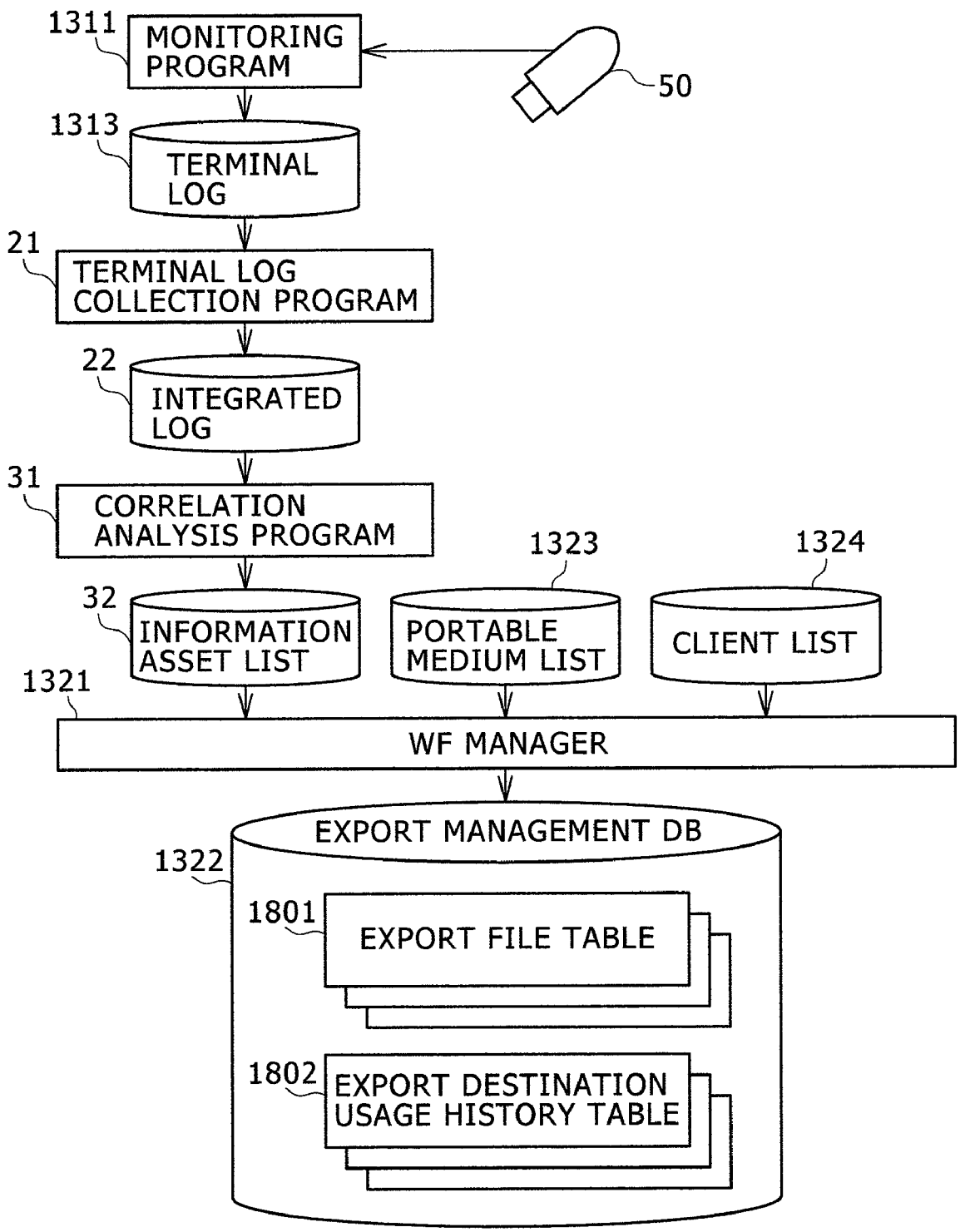
FIG. 18 illustrates data contained in and associated with an export management database in the third embodiment.

Data contained in and associated with the export management database 1322 used in the information asset management reporting system 1300 will now be described with reference to FIG. 18. The export management database 1322 stored in the WF server 1320 includes an export file table 1801 for managing files stored in portable media 50 and an export destination usage history table 1802 for managing how portable media 50 are used in export destinations. Each of the export file table 1801 and the export destination usage history table 1802 includes the same number of sheets as that of the portable media 50 managed in the portable medium list 1323.

The export file table 1801 is constructed by storing results of retrieving, using portable medium device IDs managed in the portable medium list 1323, files that are stored in portable media having the same device IDs as those managed in the portable medium list 1323 from the information asset list 32 of the information asset management reporting system 100 according to the first embodiment described above.

The export destination usage history table 1802 is constructed by collecting the contents of a log in the invisible region 1450 of each portable medium 50. When the portable medium 50 is coupled to the client 10, the monitoring program 1311 running on the client 10 reads the invisible region 1450 and collects the contents of the log in the invisible region 1450 and then stores the collected contents of the log in the terminal log 1313. Then, the terminal log collection and correlation analysis programs 21 and 31 sequentially collect the log information to construct a sheet of the export destination usage history table 1802 as shown in FIG. 18.

A flow of operations and example screens of the information asset management reporting system 1300 according to the third embodiment shown in FIG. 13 will now be described with reference to FIGS. 15 to 17.

Figure 15:
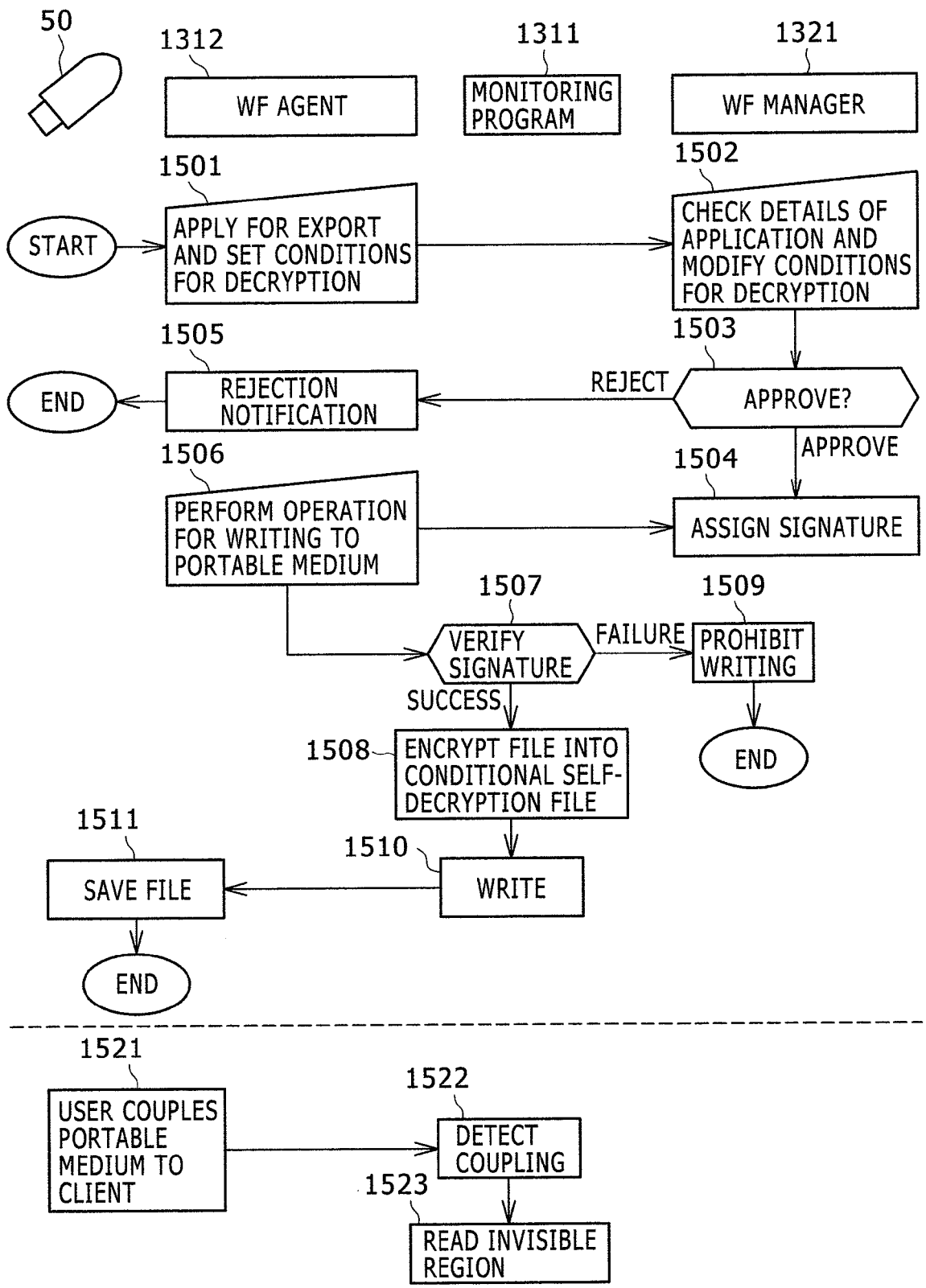
FIG. 15 is a flow chart illustrating the operation of the information asset management reporting system when a file is exported to a portable medium in the third embodiment.

FIG. 15 is a flow chart illustrating the operation of the information asset management reporting system 1300 when the user 1 exports a file to the portable medium 50. At step 1501, the user 1 logs into the WF agent 1312 of the client 10 and applies for export and sets conditions for decryption.

Figure 16A:
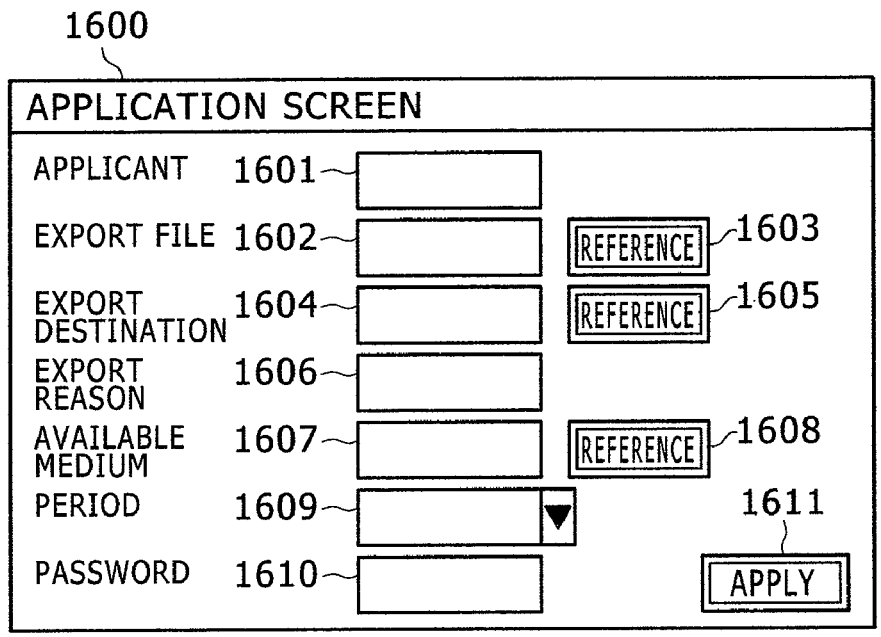
FIG. 16 illustrates an example of a WF screen when a file is exported to a portable medium in the third embodiment.

An example of an application screen displayed on the display unit of the client 10 at step 1501 will now be described with reference to FIG. 16A. The application screen 1600 includes an applicant field 1601 displaying the name of the logged-in user, a reference button 1603 for specifying a file to be exported and an export file field 1602 displaying the specified file, a reference button 1605 for specifying an export destination client and an export destination field 1604 displaying the specified export destination client, an export reason field 1606 for entering text describing the reason for export, a reference button 1608 for specifying a portable medium used for export and a used portable medium field 1607 displaying the specified portable medium, a period field 1609 for selecting a period of use of the portable medium from a pull-down menu, a password field 1601 for specifying a password, and an apply button 1611.

After logging into the WF agent 1312, the user 1 presses the reference button 1603 to select a file which they desire to export from the client to the portable medium 50. Then, the user 1 presses the reference button 1605 to select a destination client, to which the file is to be exported, from among clients managed in the client list 1324. The client 10, from which the file is written to the portable medium, is set as a default destination client, and the user 1 specifies another export destination. The user 1 then presses the reference button 1608 to select a portable medium for use in export from among portable media managed in the portable medium list 1323. The user 1 then enters the reason for export to the export reason field 1606 and selects a period in the period field 1609, and enters a password in the password field 1610. The user 1 presses the apply button 1611 after completing input of these fields.

Returning to FIG. 15, at the next step 1502, the manager 2 logs into the WF manager 1321 of the WF server 1320 and checks the details of the application or the like.

Figure 16B:
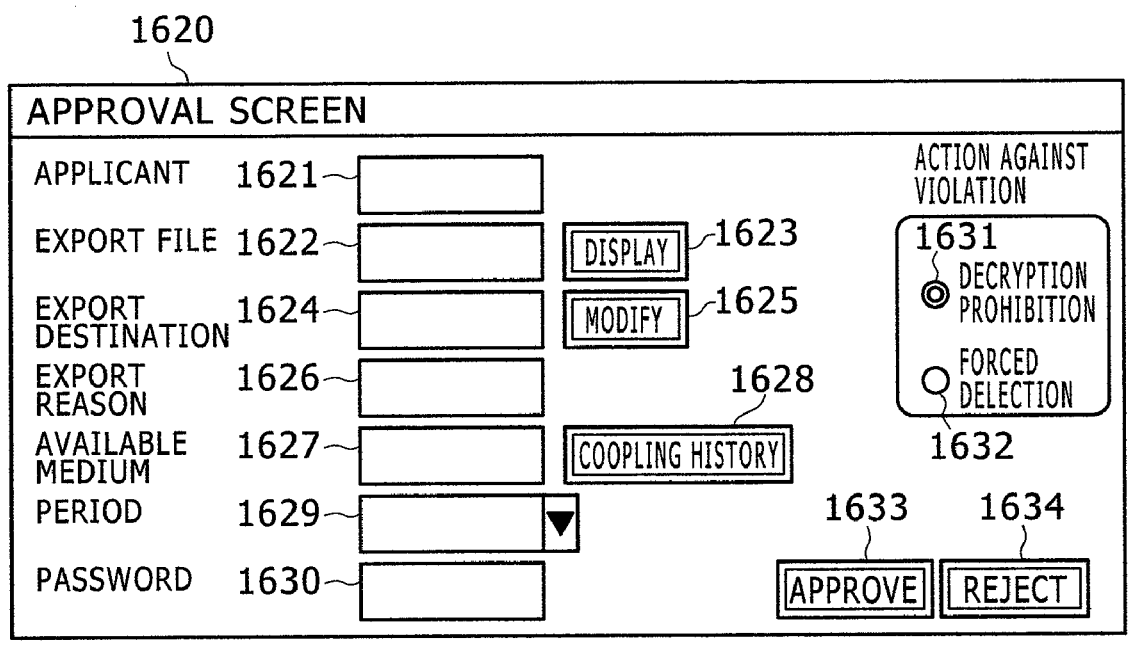

An example approval screen at step 1502 will now be described with reference to FIG. 16B. An approval screen 1620 displayed on the display unit of the WF server 1320 includes an applicant field 1621 displaying the name of the applicant, an export file field 1622 displaying the specified export file, a display button 1623 for displaying the contents of the export file, an export destination field 1624 displaying the specified export destination, a modify button 1625 for modifying the specified export destination, an export reason field 1626 displaying the reason for export, a used portable medium field 1627 displaying the specified portable medium used for export, a coupling history button 1628 for viewing the coupling history of the portable medium, a period field 1629 displaying the period of export, a password field 1630 for confirming that the password has been set, a decryption prohibition radio button 1631 and a forced deletion radio button 1632 for specifying an action to be taken in the case of violation, an approve button 1633, and a reject button 1634.

After logging into the WF manager 1321, the manager 2 presses the display button 1623 confirms that information that should not be exported is not included in the export file and confirms that the export destination field 1624, the export reason field 1626, and the period field 1629 are correct. The manager 2 then presses the coupling history button 1628 to confirm that the portable medium 50 used for export has never been coupled to an unauthorized client or that there is no trace of unauthorized decryption of the export file. After confirming these facts, the manager 2 specifies an action to be taken in the case of violation using the decryption prohibition radio button 1631 or the forced deletion radio button 1632 and then presses the approve button 1633 or the reject button 1634. Alternatively, when the coupling history button 1628 is pressed, the client list 1324 may be checked to highlight a log indicating that the portable medium was coupled to a PC which is not managed in the client list 1324.

Returning to FIG. 15, at the next step 1503, the procedure proceeds to step 1504 when the manager 2 has pressed the approve button 1633 at step 1502 and proceeds to step 1505 when the manager 2 has pressed the reject button 1634 at step 1502. At step 1505, rejection notification is provided and the export procedure is then terminated.

At step 1504, the WF manager 1321 writes conditions for decryption approved in the approve screen 1602 as a file and assigns a signature to the file approved for export in combination with the file of the conditions for decryption.

At step 1506, the user 1 performs an operation for writing the file from the client 10 to the portable medium 50 upon receiving approval notification from the WF agent 1312. In addition, when the portable medium 50 is coupled to the client 10, it may be determined whether or not the portable medium 50 is included in the portable medium list 1323 and the portable medium 50 may be forced to be decoupled when the portable medium 50 is not included in the portable medium list 1323.

At step 1507, the monitoring program 1311 in the client 10, which monitors writing to the portable medium 50, verifies a signature attached to conditions for decryption and the file to be written. The procedure proceeds to step 1508 if the verification has succeeded and proceeds to step 1509 if the verification has failed or if no signature has been attached. At step 1509, the monitoring program 1311 prohibits writing to the portable medium 50 and terminates the procedure.

At step 1508 after the verification has succeeded, based on the conditions for decryption approved at step 1504, the monitoring program 1311 encrypts the file to be exported into a conditional self-decryption file 1400 with the conditions for decryption embedded in the file 1400.

At step 1510, the monitoring program 1311 of the client 10 performs writing to the normal accessible region 1440 of the portable medium 50. At step 1511, the conditional self-decryption file 1400 is saved in the portable medium 50 and the procedure is then terminated.

When the user 1 couples the portable medium 50 to the client 10 (step 1521), the monitoring program 1311 detects that the portable medium has been coupled (step 1522) and reads log information from the invisible region 1450 and then records the log information in the terminal log 1313 (step 1523). The terminal log 1313 is stored in the export management database 1322 as described above with reference to FIG. 18.

The flow of operations of an export destination of the portable medium 50 will now be described with reference to FIG. 17.

When the user 1 couples the portable medium 50 to an export destination PC (step 1701), the log recording program 1410 in the portable medium 50 is automatically activated (step 1702). The log recording program 1410 is not necessarily automatically activated and may be manually activated by the user 1. The log recording program 1410 collects information of the destination PC coupled to the portable medium 50 (step 1703), generates a handle for opening the invisible region 1450 in exclusive mode to access the invisible region 1450, and records information of the destination PC coupled to the portable medium 50 in a log (1704). Opening the handle in exclusive mode prevents reading and writing of information from and to the invisible region 1450, for example using a computer forensic tool, while the log recording program 1410 is running.

The user 1 then clicks the conditional self-decryption file 1400 in the portable medium 50 to perform a decryption operation (step 1711), the conditional self-decryption file 1400 checks whether or not the log recording program 1410 is running (step 1712). The self-decryption file 1400 then checks whether or not the running program has been altered using the log recording program identifier 1405 (step 1713). The self-decryption file 1400 stops decryption when it is determined at step 1712 that the log recording program 1410 is not running or when it is determined at step 1713 that the log recording program 1410 has been altered (step 1714).

The self-decryption file 1400 then transmits conditions for decryption to the log recording program 1410 (step 1715). The log recording program 1410 checks, using the export destination PC identifier 1402, whether or not the PC coupled to the portable medium 50 is a specified coupling destination PC (step 1716). The log recording program 1410 then checks, using the portable medium identifier 1403, whether or not the portable medium 50 being used is a specified portable medium (step 1717). The log recording program 1410 then checks whether or not the time of the coupling destination PC matches the date and time 1431 in the log in the invisible region 1450. For example, the log recording program 1410 checks whether or not the current time of the PC is later than the time when the portable medium 50 was decoupled last or whether or not the current time is later than the date and time when decryption of the conditional self-decryption file 1400 succeeded or failed last. Alternatively, the log recording program 1410 may check, using the encryption date and time 1407, whether or not the current time of the PC is later than the encryption date and time. The log recording program 1410 then checks, using the export period 1404, whether or not the current time is within a predetermined period from the approved date and time (step 1719). Finally, the log recording program 1410 requests that the user 1 enter a password and checks whether or not the entered password is identical to the password 1401 (step 1720).

If the checked result at any of the steps 1716 to 1720 is negative, the log recording program performs an action specified in the action 1406 and logs a message indicating the failed decryption in the invisible region 1450 (step 1722). If the checked results at steps 1716 to 1720 are all positive, the log recording program 1410 outputs a prompt asking the user 1 to specify a decryption target (step 1721) and decrypts the specified decryption target and logs a message indicating successful decryption in the invisible region 1450 (step 1722).

When the user 1 decouples the portable medium 50 from the PC, the log recording program 1410 logs a message indicating the decoupling in the invisible region 1450 when the program is terminated (step 1732).

Figure 17:
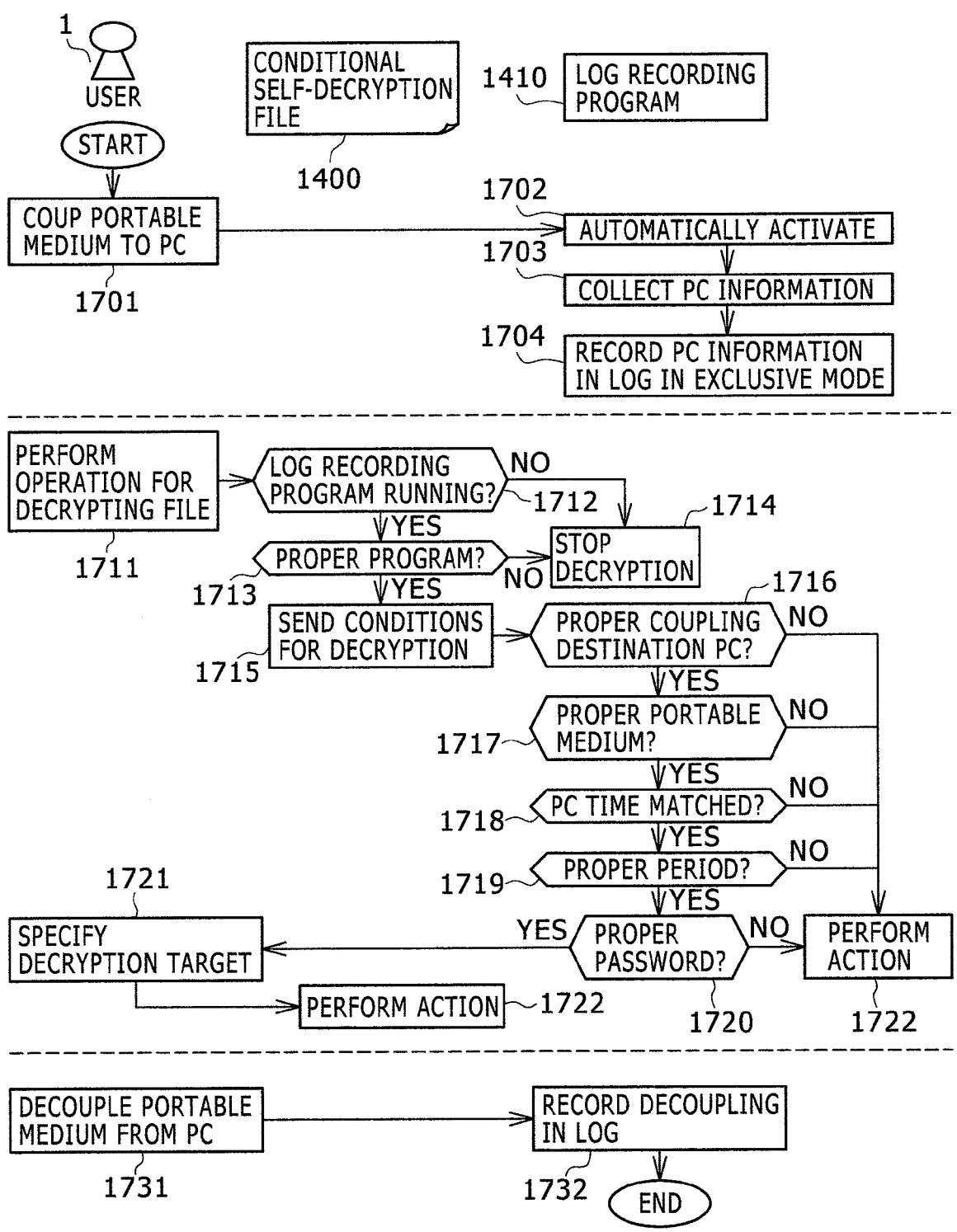
FIG. 17 is a flow chart illustrating the operation of an export destination of a portable medium when a file is exported to the portable medium in the third embodiment.

Alternatively, a program into which the conditional self-decryption file 1400 and the log recording program 1410 are integrated may perform steps 1711 to 1722 in the flow of operations shown in FIG. 17 in order to determine whether or not the conditions for decryption are satisfied.

Although the information asset management reporting system 1300 of this embodiment has been described for the case where an information asset (or file) is written to the portable medium 50, the invention is not limited to the case of writing to the portable medium 50 and the same information asset management can be performed in other cases such as attachment of a file to an email or saving of a file in a portable notebook PC or PDA. The email and the notebook computer or PDA may be referred to as a portable medium in a broad sense. The destination of a file attached to an email, and a notebook computer or PDA may all be managed in the WF server 1320 and conditions for decryption of the conditional self-decryption file may be changed appropriately for the cases of employing email and portable note PC or PDA, so that the same information asset management as in the case where the file is written to the portable medium 50 can be applied to such cases.

According to the information asset management reporting system of the third embodiment described above, when a file is exported by copying it to a portable medium, information indicating a PC to which the portable medium has been coupled is left in the portable medium so that, through a later examination, it is possible to check whether or not any unauthorized use of the file such as copying of the file to a PC at home has occurred. By checking whether or not the conditional self-decryption file satisfies conditions for decryption, it is possible to prevent leakage of the file at an arbitrary PC even when the file has been copied to a PC not under management. In addition, even when the portable medium is found after being lost or stolen, it is possible to determine whether or not any suspicious access was made to the file in a period during which the portable medium was away.

As described above, the information asset management reporting system according to the invention can be applied to the network environment of any information system in a call center which handles personal information, a business field which handles trade secrets, a design development field which handles intellectual property information, and the like. The information asset management reporting system according to the invention can also be applied to the network environment of any information system in an outsourcing company which conducts work with business information or the like received from customers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An information asset management system, comprising:
a log collector, configured to collect terminal logs and store an integrated terminal log, including respective attribute information of an information asset before and after an analyzed event occurs to the information asset;
a log analyzer, configured to create an information asset list that tracks information assets, and to analyze the integrated log created by the log collector, such that:
the log analyzer is configured to search the information asset list by using attribute information from before the occurrence of the analyzed event, when an analyzed event is an export process from the information asset management system or a file conversion process of the information asset;
the log analyzer is configured to search the information asset list by using attribute information from after the occurrence of the analyzed event, when an analyzed event is an import process from the information asset management system or an inverse file conversion process of the information asset; and
the log analyzer is configured to renew the attribute information of the information asset by using attribute information from after the occurrence of the analyzed event, when an information asset in the information asset list corresponds to a searched information asset; and
a terminal, operated by a user, and configured to communicate with at least one of the log collector and the log analyzer.

2. The information asset management system according to claim 1,
wherein the log collector is configured to output a terminal log including attribute information including file names and path names of the information asset recorded before and after the analyzed event, and the log analyzer is configured to search the information asset list with the file name and the path name recorded before the occurrence of the analyzed event, when an analyzed event is an export process from the information asset management system or a file conversion process of the information asset; and
wherein the log collector is configured to output a terminal log including attribute information including a feature value of the information asset recorded after the analyzed event, and the log analyzer is configured to search the information asset list with the feature value recorded after the occurrence of the analyzed event, when an analyzed event is an import process from the information asset management system or an inverse file conversion process of the information asset.

3. The information asset management system according to claim 2, wherein the log analyzer is configured to add the searched information asset to the information asset list, when the analyzed event is an import process from the information asset management system or an inverse file conversion process of the information asset, and when no information asset in the information asset list corresponds to the searched information asset.

4. The information asset management system according to claim 1,
wherein an analyzed event of an export process or a file conversion process includes at least one of: a writing of the information asset to a portable medium, a printing of the information asset, and a transmission of the information asset over a network; and
wherein an analyzed event of an import process or an inverse file conversion process includes at least one of: a reading of the information asset from the portable medium, a scanning of the printing of the information asset, and a reception of the information asset over the network.

5. The information asset management system of claim 1, wherein the information asset list provides access to separate data sheets, each data sheet corresponding to an information asset.

6. A log analyzer for an information asset management system, including a log collector configured to track a terminal, the log analyzer comprising:
   a memory, configured to store an information asset list configured to track information assets; and
   a processing unit, configured to process a terminal log output by the log collector, such that:
      the processing unit is configured to search the information asset list by using attribute information from before the occurrence of an analyzed event included in the terminal log, when the analyzed event is an export process from the information asset management system or a file conversion process of the information asset,
      the processing unit is configured to search the information asset list by using attribute information from after the occurrence of an analyzed event included in the terminal log, when the analyzed event is an import process from the information asset management system or an inverse file conversion process of the information asset, and
      the processing unit is configured to renew an attribute information of the information asset by using attribute information from after the occurrence of an analyzed event included in the terminal log, when the information asset is represented in the information asset list.

7. The log analysis server according to claim 6, wherein when the analyzed event is an export process from the information asset management system or a file conversion process of the information asset, the log analyzer being configured to search the information asset list by using attribute information including a file name and a file path name from before the occurrence of the analyzed event; and
   wherein when the analyzed event is an import process from the information asset management system or an inverse file conversion process of the information asset, the log analyzer being configured to search the information asset list by using attribute information including a feature value from after the occurrence of the analyzed event.

8. The log analyzer of claim 6, wherein the information asset list provides access to a separate data sheets, each data sheet corresponding to an information asset.

9. An information asset management system, comprising:
   a log collector configured to track a terminal, the log collector including:
   a processing unit configured to collect a terminal log, the terminal log including attribute information of an information asset before and after an analyzed event occurring to the information asset; and
   an output unit configured to output the terminal log;
   wherein the log collector is configured to output a terminal log, including a file name and a path name of the information asset from before and after the occurrence of the analyzed event, when the analyzed event is an export process from the information asset management system or a file conversion process of the information asset; and
   wherein the log collector is configured to output a terminal log, including a feature value of the information asset from after the occurrence of the analyzed event, when the analyzed event is an import process from the information asset management system or an inverse file conversion process of the information asset; and
   a log analyzer, configured to create an information asset list that tracks information assets, and to analyze the integrated log created by the log collector, wherein the log analyzer is configured to search the information asset list by using attribute information from before the occurrence of the analyzed event, when an analyzed event is an export process from the information asset management system or a file conversion process of the information asset,
   wherein the log analyzer is configured to search the information asset list by using attribute information from after the occurrence of the analyzed event, when an analyzed event is an import process from the information asset management system or an inverse file conversion process of the information asset, and
   wherein the log analyzer is configured to renew the attribute information of the information asset by using attribute information from after the occurrence of the analyzed event, when an information asset in the information asset list corresponds to a searched information asset.

* * * * *